(12) United States Patent
Ishii et al.

(10) Patent No.: US 9,001,378 B2
(45) Date of Patent: Apr. 7, 2015

(54) PRINT LABEL PRODUCING APPARATUS, CONTENTS PROCESSING PROGRAM, AND CONTENTS PROCESSING METHOD

(71) Applicant: Brother Kogyo Kabushiki Kaisha, Nagoya-shi, Aichi-ken (JP)

(72) Inventors: Hidekazu Ishii, Nagoya (JP); Koichi Kondo, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/848,855

(22) Filed: Mar. 22, 2013

(65) Prior Publication Data
US 2013/0301063 A1  Nov. 14, 2013

(30) Foreign Application Priority Data
May 10, 2012  (JP) .................. 2012-108839

(51) Int. Cl.
*H04N 3/08* (2006.01)
*H04N 1/40* (2006.01)
*H04N 1/23* (2006.01)
*G06K 15/02* (2006.01)
*B41J 3/407* (2006.01)
*G06F 3/12* (2006.01)
*G06K 15/00* (2006.01)

(52) U.S. Cl.
CPC ............. *G06K 15/024* (2013.01); *B41J 3/4075* (2013.01); *G06F 3/1204* (2013.01); *G06F 3/1271* (2013.01); *G06F 3/128* (2013.01); *G06K 15/402* (2013.01)

(58) Field of Classification Search
USPC .................. 358/1.13, 1.15, 504, 518, 1.9, 1.6
See application file for complete search history.

(56) References Cited

U.S. PATENT DOCUMENTS

| | | | |
|---|---|---|---|
| 2005/0012950 A1* | 1/2005 | Kurashina | 358/1.12 |
| 2011/0007354 A1* | 1/2011 | Seki et al. | 358/1.15 |
| 2011/0292430 A1* | 12/2011 | Kang et al. | 358/1.13 |
| 2013/0274669 A1* | 10/2013 | Stempfle et al. | 604/151 |

FOREIGN PATENT DOCUMENTS

| | | |
|---|---|---|
| JP | 61049294 | 3/1986 |
| JP | 2000326592 | 11/2000 |
| JP | 2003127507 | 5/2003 |
| JP | 2006099261 | 4/2006 |

* cited by examiner

*Primary Examiner* — Kawasi M Sarpong
(74) *Attorney, Agent, or Firm* — McCarter & English, LLP

(57) ABSTRACT

The disclosure discloses a print label producing apparatus. The apparatus includes a producing apparatus side attaching/detaching portion to and from which a nonvolatile storage device can be attached and detached, an attachment determining portion configured to determine whether or not the storage device is attached to the producing apparatus side attaching/detaching portion, a selection information write portion configured to write unique selection material information to the storage device in an attached state, and a contents acquisition portion configured to acquire contents stored in the storage device and corresponding to the selection material information when the attachment determining portion determines that the storage device is attached to the producing apparatus side attaching/detaching portion.

3 Claims, 8 Drawing Sheets

COMPARATIVE EXAMPLE

PRINT LABEL PRODUCING APPARATUS, CONTENTS PROCESSING PROGRAM, AND CONTENTS PROCESSING METHOD

CROSS-REFERENCE TO RELATED APPLICATION

The present application claims priority from Japanese Patent Application No. 2012-108839, which was filed on May 10, 2012, the disclosure of which is incorporated herein by reference in its entirety.

BACKGROUND

1. Field

The present disclosure relates to a print label producing apparatus for performing printing using appropriate contents and a contents processing program relating to the contents and a template processing method.

2. Description of the Related Art

There is known a print label producing apparatus for producing a print label by performing desired printing on a print-receiving medium. In the print label producing apparatus of prior arts, printing corresponding to printing data is performed on a print-receiving medium (laminate film) with printing means (thermal head), thereby a print label is produced. In the prior art, a plurality of kinds of so-called template, in which a plurality of print object arrangement frames are allocated in a predetermined mode, are provided in order to avoid the complicated operation performed by an operator to manually set print objects, such as text and figures, to be printed on the print label. It is possible for an operator to easily produce a desired print label by selecting a template suitable for the print mode intended by the operator and allocating desired text etc. to the print object arrangement frame in the template.

In order to avoid the complicated operation as described above and to improve convenience, there is a case where images used in relation to production of other labels, software, such as an OS, applications, and various kinds of driver, etc., are used appropriately in addition to the above described templates (hereinafter, these templates, images, software, etc., are called together "contents").

However, the above described prior art has the following problem. That is, when using the above described contents, a print label producing apparatus is connected directly to a contents supply apparatus, such as an external server and a personal computer, in which a number of the above described contents are stored. Subsequently, the print label producing apparatus acquires contents from the contents supply apparatus. At this time, it is necessary for an operator to search for and specify contents suitable for the print label producing apparatus from a tremendous number of contents stored in the contents supply apparatus by a manual operation and then to perform the operation to cause the print label producing apparatus to acquire the specified contents. Such a complicated operation causes the burden of work of the operator to increase, therefore the prior art is inconvenient.

SUMMARY

An object of the present disclosure is to provide a print label producing apparatus, a contents processing program, and a contents processing method capable of reducing the burden of operation work of an operator when acquiring contents from a contents supply apparatus to the print label producing apparatus and of improving convenience.

In order to achieve the above-described object, according to the first aspect of the present application, there is provided a print label producing apparatus comprising a feeder configured to feed a print-receiving medium, a printing head configured to form a print on the print-receiving medium fed by the feeder, a producing apparatus side attaching/detaching portion to and from which a nonvolatile storage device capable of acquiring a plurality of kinds of contents different from one another from a contents supply apparatus can be attached and detached, an attachment determining portion configured to determine whether or not the storage device is attached to the producing apparatus side attaching/detaching portion, a selection information write portion configured to write unique selection material information to select the contents suitable for the print label producing apparatus to the storage device in an attached state when the attachment determining portion determines that the storage device is attached, and a contents acquisition portion configured to acquire contents stored in the storage device and corresponding to the selection material information when the attachment determining portion determines that the storage device storing the contents supplied from the contents supply apparatus in a state of being detached from the producing apparatus side attaching/detaching portion is attached to the producing apparatus side attaching/detaching portion.

In the aspect in this application, an attaching/detaching part (producing apparatus side attaching/detaching portion) to and from which a nonvolatile storage device can be attached and detached is provided in a print label producing apparatus for producing a print label. Then, it is possible for an operator to transmit and receive various kinds of information and the above described contents between a contents supply apparatus capable of supplying contents, such as templates and various kinds of software, used for print label production, and the above described print label producing apparatus by using the above described storage device as a medium.

First, determining portion determines whether or not the above described storage device is attached to the above described producing apparatus side attaching/detaching portion. When the result of the determination is affirmative, selection information write portion writes unique selection material information for selecting contents suitable for the print label producing apparatus to the storage device in the attached state. Specifically, for example, a model type and serial number of the print label producing apparatus, label attribute information (tape width, character color, tape color, etc., of the used print-receiving tape) whose frequency is high in a past label production history in the print label producing apparatus, and production work information (number of times of label printing, categories of used contents, etc.) in a print label production history in the print label producing apparatus are written.

After the selection material information is written in this manner, the operator detaches the storage device from the producing apparatus side attaching/detaching portion of the print label producing apparatus and attaches the storage device to the contents supply apparatus. In the contents supply apparatus, a plurality of kinds of contents different from one another is stored and at least part of the plurality of kinds of contents are written to the storage device.

After the contents are written in this manner, the operator attaches the storage device again to the producing apparatus side attaching/detaching portion of the print label producing apparatus. As a result, the determination relating to attachment of the storage device to the producing apparatus side attaching/detaching portion performed by attachment determining portion will be affirmative. As a result of this, contents acquisition portion acquires contents written to and stored in the storage device from the contents supply apparatus as described above.

In the manner described above, the storage device acquires and stores contents from the contents supply apparatus and the print label producing apparatus acquires contents from the storage device. By using the storage device as a medium in this manner, it is possible to easily transmit and receive various kinds of information and the above described contents between the above described contents supply apparatus and the above described print label producing apparatus without the need to make various kinds of connections via wired or wireless communication therebetween.

When the contents are transmitted and received via a medium as described above, selection material information unique to the print label producing apparatus is written to the storage device from the print label producing apparatus. Then, by making use of the selection material information, it is possible to introduce the only contents suitable for the print label producing apparatus (or to preferentially introduce the suitable contents) when introducing contents from the contents supply apparatus into the print label producing apparatus via the storage device.

That is, in the aspect in this application, the contents acquisition portion selects and acquires contents corresponding to the above described selection material information from the plurality of kinds of contents already written to and stored in the storage device from the contents supply apparatus at the point of time of the acquisition. As a result, the above described acquisition of contents is performed in the mode in which contents are reduced in number to contents suitable for the print label producing apparatus or in the mode in which priority is given thereto (in other words, in the mode in which unnecessary contents are excluded or priority is not given thereto). As a result of this, even though the contents storage capacity in the print label producing apparatus is small, it is possible to securely introduce contents with high possibility for use by the operator into the print label producing apparatus and to use the contents.

Moreover, by the normal method in which contents are transmitted and received by directly connecting the print label producing apparatus and the contents supply apparatus, it is necessary for the operator to search for and specify contents suitable for the print label producing apparatus from a tremendous number of contents stored in the contents supply apparatus with a manual operation and then to perform the operation to cause the print label producing apparatus to acquire the specified contents. In contrast to this, in the first aspect in this application, the complicated operation as described above is made no longer necessary by making use of the selection material information described above, therefore it is possible to remarkably reduce the burden of operation of the operator and to improve convenience.

Further, it is also possible to newly update the selection material information mentioned above by producing a print label after introducing contents into the print label producing apparatus by attaching the storage device to the producing apparatus side attaching/detaching portion of the print label producing apparatus as mentioned above. In this case, the operator detaches the storage device storing the above described updated selection material information from the producing apparatus side attaching/detaching portion after the production of the above described print label is completed. As a result, it is possible to perform transmission and reception of contents from the contents supply apparatus to the print label producing apparatus via the storage device again as described above by using the above described updated selection material information. By repeating this performance, it is also possible to securely introduce optimum contents for the print label producing apparatus at that point of time from the contents supply apparatus into the print label producing apparatus each time the print label producing apparatus is used.

In order to achieve the above-described object, according to the second aspect of the present application, there is provided a non-transitory computer-readable recording medium, storing a contents processing program for executing steps on a control device provided in a contents supply apparatus comprising an operation device configured allowing an operator to operate, a display device configured to perform a predetermined display, a memory device readably configured storing a plurality of kinds of contents different from one another, a supply apparatus side attaching/detaching portion capable of attaching and detaching a nonvolatile storage device to be attached to and detached from a print label producing apparatus, and the control device, the steps comprising an attachment determination step for determining whether or not the storage device is attached to the supply apparatus side attaching/detaching portion, a selection information acquisition step for acquiring unique selection material information to select the contents stored in the storage device and suitable for the print label producing apparatus when it is determined that the storage device is attached to the supply apparatus side attaching/detaching portion in the attachment determination step, and a contents write step for selecting contents corresponding to the selection material information acquired in the selection information acquisition step among the plurality of kinds of contents stored in the memory and for writing the selected contents to the storage device in a state of being attached to the supply apparatus side attaching/detaching portion.

In the second aspect, in the contents supply apparatus capable of supplying contents, such as templates and various kinds of software, used for print label production in the print label producing apparatus, an attaching/detaching part (supply apparatus side attaching/detaching portion) to and from which a nonvolatile storage device to be attached to and detached from the above described print label producing apparatus can be attached and detached is provided. It is possible for the operator to perform transmission and reception of various kinds of information and the above described contents between the above described contents supply apparatus and the above described print label producing apparatus by using the above described storage device as a medium.

That is, in the aspect in this application, first, the storage device to which unique selection material information to select contents suitable for the print label producing apparatus is written at the time of attachment to the print label producing apparatus is attached to the supply apparatus side attaching/detaching portion. Specifically, the selection material information is, for example, a model type and serial number of the print label producing apparatus, label attribute information (tape width, character color, tape color, etc., of the used print-receiving tape) whose frequency is high in a past label production history in the print label producing apparatus, and production work information (number of times of label printing, categories of used contents, etc) in a print label production history in the print label producing apparatus.

At this time, in memory, a plurality of kinds of contents different from one another is stored. When the storage device is attached to the supply apparatus side attaching/detaching portion by the operator in the manner described above, the determination relating to attachment of the storage device to the supply apparatus side attaching/detaching portion by an attachment determination step will be affirmative. As a result of this, by a contents write step after a selection information acquisition step (details will be described later), the contents stored in the memory as described above are written to the storage device attached to the above described supply apparatus side attaching/detaching portion. After the contents are written in this manner, the operator detaches the storage device from the supply apparatus side attaching/detaching portion of the contents supply apparatus and attaches the storage device to the print label producing apparatus again. As a result, the contents written to and stored in the storage device as described above are acquired by the print label producing apparatus side.

In the manner described above, the storage device acquires and stores contents from the contents supply apparatus and the print label producing apparatus acquires the contents from the storage device. By using the storage device as a medium, it is possible to easily transmit and receive various kinds of information and the above described contents between the above described contents supply apparatus and the above described print label producing apparatus without the need to make various kinds connections via wired or wireless communication therebetween.

When the contents are transmitted and received via a medium as described above, the storage device stores selection material information unique to the print label producing apparatus. Then, by making use of the selection material information, it is possible to introduce the only contents suitable for the print label producing apparatus (or to preferentially introduce the suitable contents) when introducing contents from the contents supply apparatus into the print label producing apparatus via the storage device.

That is, in the aspect in this application, by the above described contents write step, contents corresponding to the above described selection material information stored in the storage device are selected from the plurality of kinds of contents stored in the memory of the contents supply apparatus and written describe above. As a result, at the point of time when the storage device acquires contents from the contents supply apparatus, the above described acquisition of contents is performed in the mode in which contents are reduced in number to contents suitable for the print label producing apparatus or in the mode in which priority is given thereto (in other words, in the mode in which unnecessary contents are excluded or priority is not given thereto). As a result of this, even though the contents storage capacity in the print label producing apparatus is small, it is possible to securely introduce contents with high possibility for use by the operator into the print label producing apparatus and use.

By the normal method in which contents are transmitted and received by directly connecting the print label producing apparatus and the contents supply apparatus, it is necessary for the operator to search for and specify contents suitable for the print label producing apparatus from a tremendous number of contents stored in the contents supply apparatus with a manual operation and then to perform the operation to cause the print label producing apparatus to acquire the specified contents. In contrast to this, in the second aspect in this application, the complicated operation as described above is made no longer necessary by making use of the above described selection material information described above, therefore it is possible to remarkably reduce the burden of operation of the operator and to improve convenience.

Further, it is also possible to newly update the above described selection material information described above by producing a print label after introducing contents into the above described print label producing apparatus by attaching the storage device to the print label producing apparatus. In this case, the operator detaches the storage device storing the above described updated selection material information after the production of print label is completed. As a result, it is possible to perform transmission and reception of contents from the contents supply apparatus to the print label producing apparatus via the storage device again as described above by using the above described updated selection material information. By repeating this performance, it is also possible to securely introduce optimum contents for the print label producing apparatus at that point of time from the contents supply apparatus into the print label producing apparatus each time the print label producing apparatus is used.

In order to achieve the above-described object, according to the third aspect of the present application, there is provided a contents processing method comprising a first determination step for determining whether or not a nonvolatile storage device is attached to a producing apparatus side attaching/detaching portion provided in a print label producing apparatus configured to produce a print label by forming a print on a print-receiving medium, a selection information write step for writing unique selection material information to select the contents suitable for the print label producing apparatus to the storage device in an attached state when it is determined that the storage device is attached to the producing apparatus side attaching/detaching portion of the print label producing apparatus in the first determination step, a second determination step for determining whether or not the storage device storing the selection material information written in the selection information write step is attached to a supply apparatus side attaching/detaching portion provided in a contents supply apparatus, a contents write step for writing at least part of a plurality of kinds of contents different from one another stored in a memory of the contents supply apparatus to the storage device in a state of being attached to the supply apparatus side attaching/detaching portion when it is determined that the storage device is attached to the supply apparatus side attaching/detaching portion in the second determination step, a third determination step for determining whether or not the storage device storing the contents written in the contents write step is attached to the producing apparatus side attaching/detaching portion of the print label producing apparatus, and a contents acquisition step for acquiring at least part of contents stored in the storage device when it is determined that the storage device is attached to the producing apparatus side attaching/detaching portion in the third determination step, wherein at least one of a first selection process and a second selection process is performed, the first selection process selecting contents corresponding to the selection material information acquired from the storage device among the plurality of kinds of contents stored in the memory of the contents supply apparatus in the contents write step, the second selection processing selecting contents corresponding to the selection material information among the plurality of kinds of contents stored in the storage device in the contents acquisition step.

In the third aspect, in the print label producing apparatus for producing a print label, an attaching/detaching part (producing apparatus side attaching/detaching portion) to and from which a nonvolatile storage device can be attached and detached is provided. Further, also in the contents supply apparatus capable of supplying contents, such as templates and various kinds of software, used for print label production, an attaching/detaching part (supply apparatus side attaching/detaching portion) to and from which the above described nonvolatile storage device can be attached and detached is provided. It is possible for the operator to perform transmission and reception of various kinds of information and the above described contents between the above described contents supply apparatus and the above described print label producing apparatus by using the above described storage device as a medium.

That is, in the aspect in this application, first, by a first determination step, whether or not the above described storage device is attached to the above described producing apparatus side attaching/detaching portion of the print label producing apparatus is determined. When the determination is affirmative, by a subsequent selection information write step, unique selection material information to select contents suitable for the print label producing apparatus is written to the storage device in the attached state. Specifically, for example, a model type and serial number of the print label producing apparatus, label attribute information (tape width, character color, tape color, etc., of the used print-receiving tape) whose frequency is high in a past label production history in the print label producing apparatus, and production work information (number of times of label printing, categories of used contents, etc) in a print label production history in the print label producing apparatus are written.

After selection material information is written in this manner, the operator detaches the storage device from the producing apparatus side attaching/detaching portion of the print label producing apparatus and attaches the storage device to the supply apparatus side attaching/detaching portion of the contents supply apparatus. In the memory of the contents supply apparatus, a plurality of kinds of contents different from one another is stored. When the storage device is attached to the supply apparatus side attaching/detaching portion in the manner described above, the determination relating to attachment of the storage device to the supply apparatus side attaching/detaching portion by a second determination step will be affirmative. As a result of this, at least part of the plurality of kinds of contents stored in the memory of the contents supply apparatus as described above are written to the storage device attached to the supply apparatus side attaching/detaching portion by the contents write step.

After the contents are written in this manner, the operator detaches the storage device from the supply apparatus side attaching/detaching portion of the contents supply apparatus and attaches the storage device to the producing apparatus side attaching/detaching portion of the print label producing apparatus again. As a result, the determination relating to attachment of the storage device to the producing apparatus side attaching/detaching portion by a third determination step will be affirmative. As a result of this, at least part of the contents written to and stored in the storage device as described above are acquired by the print label producing apparatus side by a contents acquisition step.

In the manner described above, the storage device acquires and stores contents from the contents supply apparatus and the print label producing apparatus acquires the contents from the storage device. By using the storage device as a medium, it is possible to easily transmit and receive various kinds of information and the above described contents between the above described contents supply apparatus and the above described print label producing apparatus without the need to make various kinds of connection via wired and wireless communication therebetween.

When the contents are transmitted and received via a medium as described above, selection material information unique to the print label producing apparatus is written to the storage device from the print label producing apparatus. Then, by making use of the selection material information, it is possible to introduce the only contents suitable for the print label producing apparatus (or to preferentially introduce the suitable contents) when introducing contents from the contents supply apparatus into the print label producing apparatus via the storage device. For this purpose, in the third aspect in this application, at least one of first selection processing and second selection processing is performed.

That is, the first selection processing is processing to select contents corresponding to the above described selection material information stored in the storage device from the plurality of kinds of contents stored in the memory of the contents supply apparatus in the contents write step performed by the contents supply apparatus. As a result, at the point of time when the storage device acquires contents from the contents supply apparatus, the above described acquisition of contents is performed in the mode in which contents are reduced in number to contents suitable for the print label producing apparatus or in the mode in which priority is given thereto (in other words, in the mode in which unnecessary contents are excluded or priority is not given thereto).

On the other hand, the second selection processing is processing to select contents corresponding to the above described selection material information from the plurality of kinds of contents already written to and stored in the storage device from the contents supply apparatus at this point of time in the contents acquisition step performed by the print label producing apparatus. As a result, at the point of time when the print label producing apparatus acquires contents from the storage device, the above described acquisition of contents is performed in the mode in which contents are reduced in number to contents suitable for the print label producing apparatus or in the mode in which priority is given thereto (in other words, in the mode in which unnecessary contents are excluded or priority is not given thereto).

In the manner described above, according to the aspect in this application, it is possible to introduce the only contents suitable for the print label producing apparatus (or to preferentially introduce the suitable contents) into the print label producing apparatus. As a result of this, even though the contents storage capacity in the print label producing apparatus is small, it is possible to securely introduce contents with high possibility for use by the operator into the print label producing apparatus and to use the contents.

By the normal method in which contents are transmitted and received by directly connecting the print label producing apparatus and the contents supply apparatus, it is necessary for the operator to search for and specify contents suitable for the print label producing apparatus from a tremendous number of contents stored in the contents supply apparatus with a manual operation and then to perform the operation to cause the print label producing apparatus to acquire the specified contents. In contrast to this, in the aspect in this application, the complicated operation as described above is made no longer necessary by making use of the selection material information described above, therefore it is possible to remarkably reduce the burden of operation of the operator and to improve convenience.

Further, it is also possible to newly update the above described selection material information described above by producing a print label after introducing contents into the print label producing apparatus by attaching the storage device to the producing apparatus side attaching/detaching portion of the print label producing apparatus. In this case, the operator detaches the storage device storing the above described updated selection material information from the producing apparatus side attaching/detaching portion after the above described production of print label is completed. As a result, it is possible to perform transmission and reception of contents from the contents supply apparatus to the print label producing apparatus via the storage device again as described above by using the above described updated selection material information. By repeating this performance, it is also possible to securely introduce optimum contents for the print label producing apparatus at that point of time from the contents supply apparatus into the print label producing apparatus each time the print label producing apparatus is used.

In order to achieve the above-described object, according to the fourth aspect of the present application, there is provided a contents processing method comprising a first producing apparatus side determination step for determining whether or not a nonvolatile storage device is attached to a producing apparatus side attaching/detaching portion provided in a first print label producing apparatus configured to produce a print label by forming a print on a print-receiving medium, a first selection information write step for writing unique first selection material information to select the contents suitable for the first print label producing apparatus to the storage device in an attached state when it is determined that the storage device is attached to the producing apparatus side attaching/detaching portion of the first print label producing apparatus in the first producing apparatus side determination step, a second producing apparatus side determination step for determining whether or not the storage device is attached to a producing apparatus side attaching/detaching portion provided in a second print label producing apparatus configured to produce a print label by forming a print on a print-receiving medium after the storage device to which the first selection material information is written in the first selection information write step is detached from the producing apparatus side attaching/detaching portion of the first print label producing apparatus, a second selection information write step for writing unique second selection material information to select the contents suitable for the second print label producing apparatus to the storage device in an attached state when it is determined that the storage device is attached to the producing apparatus side attaching/detaching portion of the second print label producing apparatus in the second producing apparatus side determination step, a selection information update step for changing at least part of contents of the first selection material information into third selection material information by the first print label producing apparatus after the storage device to which the first selection material information is written in the first selection information write step is detached from the producing apparatus side attaching/detaching portion of the first print label producing apparatus, a supply apparatus side determination step for determining whether or not the storage device storing the first and the second selection material information written in the first and the second selection information write step is attached to a supply apparatus side attaching/detaching portion provided in a contents supply apparatus, a contents write step for selecting contents corresponding to the first and the second selection material information acquired from the storage device among a plurality of kinds of contents different from one another stored in a memory of the contents supply apparatus and for writing the selected contents to the storage device in a state of being attached to the supply apparatus side attaching/detaching portion when it is determined that the storage device is attached to the supply apparatus side attaching/detaching portion in the supply apparatus side determination step, a third producing apparatus side determination step for determining whether or not the storage device storing the contents written in the contents write step is attached to the producing apparatus side attaching/detaching portion of the second print label producing apparatus, a first contents acquisition step for acquiring contents corresponding to the second selection material information among contents stored in the storage device when it is determined that the storage device is attached to the producing apparatus side attaching/detaching portion of the second print label producing apparatus in the third producing apparatus side determination step, a fourth producing apparatus side determination step for determining whether or not the storage device detached from the producing apparatus side attaching/detaching portion of the second print label producing apparatus after acquisition of the contents in the first contents acquisition step is completed is attached to the producing apparatus side attaching/detaching portion of the first print label producing apparatus, and a second contents acquisition step for acquiring contents corresponding to the third selection material information in a case where contents corresponding to the third selection material information is included in contents stored in the storage device in correspondence to the second selection material information when it is determined that the storage device is attached to the producing apparatus side attaching/detaching portion of the first print label producing apparatus in the fourth producing apparatus side determination step determines.

In the fourth aspect, an attaching/detaching part (producing apparatus side attaching/detaching portion) to and from which a nonvolatile storage device can be attached and detached is provided in each of a first and a second print label producing apparatus for producing a print label. In the aspect in this application, first, by a first producing apparatus side determination step, whether or not the above described storage device is attached to the above described producing apparatus side attaching/detaching portion of the first print label producing apparatus is determined. When the determination is affirmative, by a subsequent first selection information write step, unique first selection material information to select contents suitable for the first print label producing apparatus is written to the storage device in the attached state.

After the first selection material information is written in this manner, the operator detaches the storage device from the producing apparatus side attaching/detaching portion of the first print label producing apparatus and attaches the above described storage device to the above described producing apparatus side attaching/detaching portion of the second print label producing apparatus. As a result, the result of determination whether or not the storage device is attached to the producing apparatus side attaching/detaching portion of the second print label producing apparatus by a second producing apparatus side determination step will be affirmative. As a result of this, by a subsequent second selection information write step, unique second selection material information to select contents suitable for the second print label producing apparatus is written to the storage device in the attached state.

After the first and the second selection material information are written in this manner, the operator detaches the storage device from the producing apparatus side attaching/detaching portion of the second print label producing apparatus and attaches the storage device to the supply apparatus side attaching/detaching portion of the contents supply apparatus. In the memory of the contents supply apparatus, a plurality of kinds of contents different from one another is stored. When the storage device is attached to the supply apparatus side attaching/detaching portion in the manner described above, the determination relating to attachment of the storage device to the supply apparatus side attaching/detaching portion by a supply apparatus side determination step will be affirmative. As a result of this, by the contents write step, contents corresponding to the above described first and the second selection material information of the plurality of kinds of contents stored in the memory of the contents supply apparatus as described above are written to the storage device attached to the supply apparatus side attaching/detaching portion.

After the contents are written in this manner, the operator detaches the storage device from the supply apparatus side attaching/detaching portion of the contents supply apparatus and attaches the storage device to the producing apparatus side attaching/detaching portion of the second print label producing apparatus again. As a result, the determination relating to attachment of the storage device to the producing apparatus side attaching/detaching portion by a third producing apparatus side determination step will be affirmative; by a first contents acquisition step, contents corresponding to second selection material information written to and stored in the storage device as described above are acquired by the second print label producing apparatus side by a first contents acquisition step.

Here, as described previously, there is a case where the contents of the first selection material information unique to the first print label producing apparatus are changed by the production history in the print label producing apparatus or an appropriate operation of the operator performed after the above described first selection material information is written to the storage device attached to the producing apparatus side attaching/detaching portion and then detached therefrom in the first print label producing apparatus. In the aspect in this application, in correspondence to such a case, by a selection information update step performed by the first print label producing apparatus, at least part of the contents of the above described first selection material information are changed to generate third selection material information.

Then, after the contents are acquired by the second print label producing apparatus in the manner described above, the operator detaches the storage device from the producing apparatus side attaching/detaching portion of the second print label producing apparatus and attaches the storage device to the producing apparatus side attaching/detaching portion of the first print label producing apparatus again. As a result, the determination relating to attachment of the storage device to the producing apparatus side attaching/detaching portion by a fourth producing apparatus side determination step will be affirmative.

At this time, as described above, in the first print label producing apparatus, the above described first selection material information is updated and becomes the third selection material information. On the other hand, in the storage device attached to the producing apparatus side attaching/detaching portion, contents corresponding to the above described second selection material information and the above described first selection material information before updated are stored. Here, for example, there is a case where the first print label producing apparatus and the second print label producing apparatus are of the same or similar model type, or the operator of the first and the second print label producing apparatuses is the same. In such a case, even if the contents corresponding to the third selection material information and the contents corresponding to the first selection material information are different, contents corresponding to the third selection material information may be included by chance in the contents corresponding to the second selection material information.

Consequently, in the aspect in this application, with corresponding to the above description, by a second contents acquisition step, the contents corresponding to the third selection material information (also corresponding to the second selection material information) written to and stored in the storage device as described above are acquired by the first print label producing apparatus side. As a result, even though the contents of the first selection material information are updated after the first selection material information is written to the storage device in the first print label producing apparatus, contents corresponding to the updated first selection material information (=third selection material information) are acquired by the first print label producing apparatus. That is, it is possible to introduce optimum contents for the recent state of the first print label producing apparatus, therefore convenience can be further improved.

DETAILED DESCRIPTION OF THE PREFERRED EMBODIMENTS

Hereinafter, an embodiment of the present disclosure is explained with reference to the drawings.

<Schematic Configuration of System>

Figure 1:
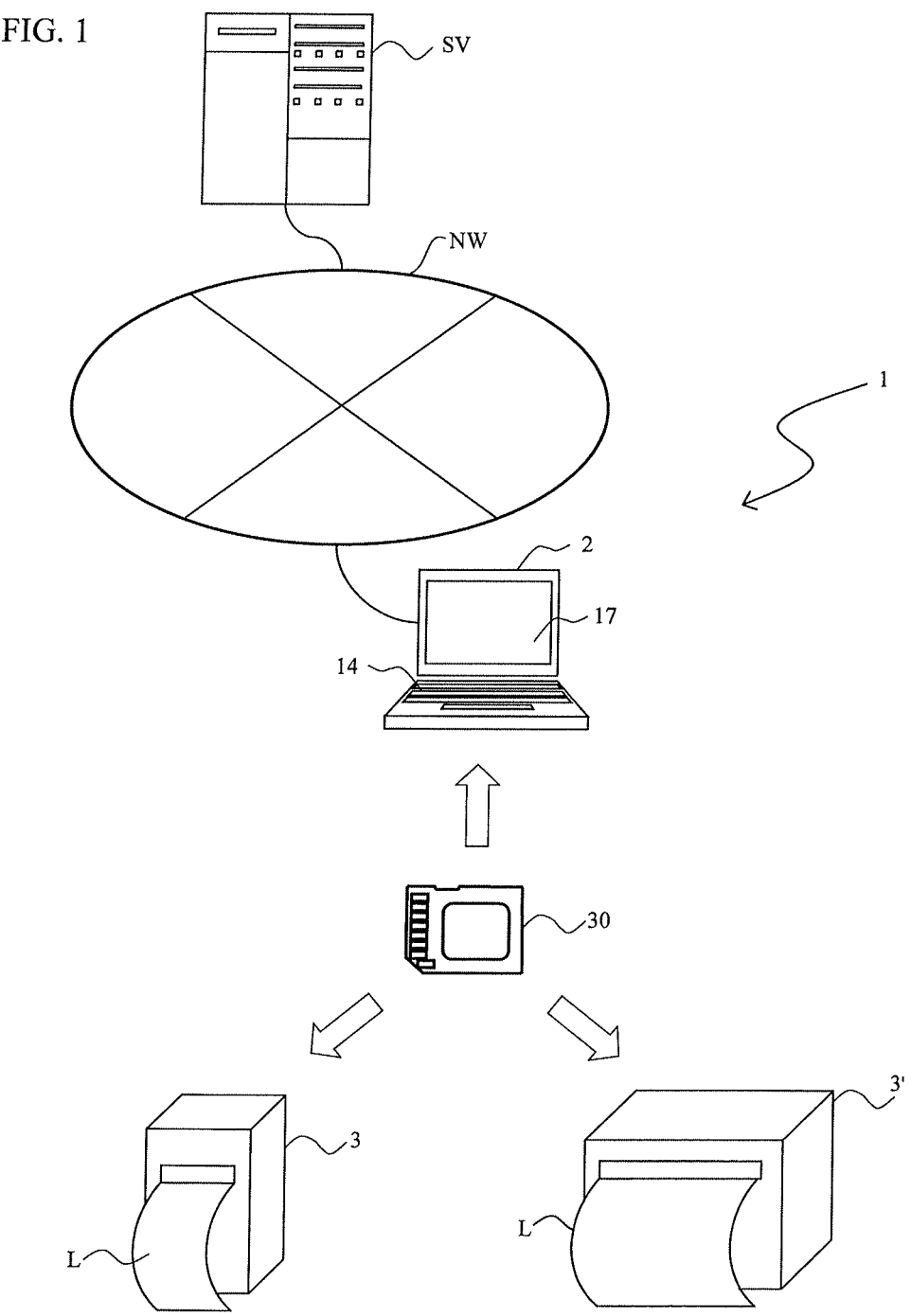
FIG. 1 is a system configuration diagram showing an outline of a contents processing system having a print label producing apparatus of an embodiment of the present disclosure.

A configuration of the whole of a contents processing system having a print label producing apparatus of the present embodiment is explained with reference to FIG. 1 and FIG. 2. In FIG. 1, a contents processing system 1 has a contents server SV (web server), an operation terminal 2 (contents supply apparatus) configured by, for example, a general-purpose personal computer, and label printers 3 and 3' (print label producing apparatus) of a plurality of model types for producing a print label L. Then, the contents server SV and the operation terminal 2 are connected to each other via a network NW.

In the present embodiment, in the label printers 3 and 3', a card attaching/detaching part 208 (see FIG. 3 to be described later) to and from which a handheld nonvolatile memory card 30 (storage device; memory attaching/detaching tool) configured by, for example, an SD card or a USB memory, can be attached and detached is provided. Further, also in the operation terminal 2, as in the label printers 3 and 3', a card attaching/detaching part 16 (see FIG. 2 and FIG. 3 to be described later) to and from which the memory card 30 can be attached and detached is provided. Then, as will be described later, it is possible for an operator to perform transmission and reception of various kinds of information and above described templates between the operation terminal 2 capable of supplying the templates used to product the print label L and the plurality of the label printers 3 and 3' by using the memory card 30 as a medium.

The label printers 3 and 3' perform transmission and reception of various kinds of information and the above described templates with the operation terminal 2 by using the memory card 30 as a medium and produce the print label L including a print, such as a desired character and figure, based on the operation in the label printers 3 and 3' by the operator. In FIG. 1, it is made possible to perform transmission and reception of various kinds of information and the templates with one another by using one memory card 30 as a medium among the operation terminal 2 connected to the contents server SV via the network NW, the label printer 3 that produces the print label L having a relatively narrow width in this example, and the label printer 3' that produces the print label L having a relatively wide width in this example.

<Operation Terminal and Contents Server>

Hereinafter, electrical configurations of the operation terminal 2 and the contents server SV are explained referring to FIG. 2.

Figure 2:
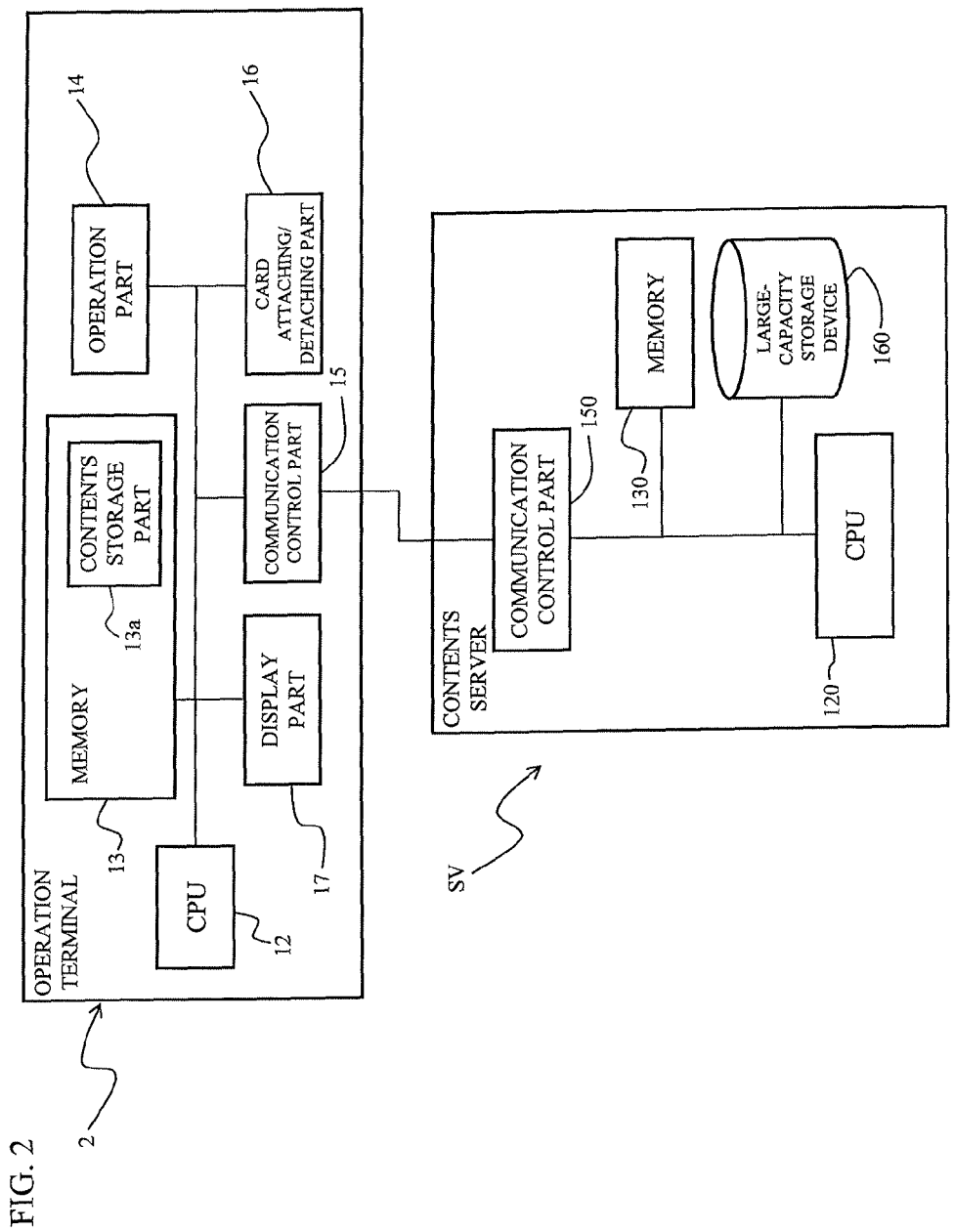
FIG. 2 is a function block diagram showing a detailed function of each part of an operation terminal and a contents server.

As shown in FIG. 2, the operation terminal 2 includes a CPU 12 (control device), a memory 13 configured by, for example, a RAM, a ROM, etc., an operation part 14 (operation device; also see FIG. 1), a display part 17 (display device; also see FIG. 1), a communication control part 15 configured to control transmission and reception of information signals with the contents server SV, and the card attaching/detaching part 16 (supply apparatus side attaching/detaching portion) configured by, for example, an SD slot etc, to and from which the above described memory card 30 can be attached and detached.

The above described ROM of the memory 13 stores contents processing programs according to the present embodiment, which are used by the operation terminal 2 to perform each step shown in sequences in FIG. 5, FIG. 6, FIG. 7, and FIG. 8, to be described later. Further, the memory 13 includes a contents storage part 13a configured to store a plurality of kinds of template different from one another (details will be described later) etc. acquired from the contents server SV in such a manner that the templates etc. can be read.

As shown in FIG. 2, the contents server SV includes a CPU 120, a memory configured by, for example, a RAM, a ROM, etc., a communication control part 150 configured to control transmission and reception of information signals with the operation terminal 2 via the network NW, and a large-capacity storage device 160. The large-capacity storage device 160 which is configured by, for example, a hard disk drive and stores a plurality of kinds of template different from one another (details will be described later) etc., relating to, for example, production of the print label L.

The CPU 120 and the CPU 12 perform signal processing in accordance with the program stored in ROMs in advance while making use of the temporary storage function of RAMs. The CPU 120 of the contents server SV performs transmission and reception of various kinds of instruction signals and information signals with the operation terminal 2 through the network NW by the signal processing described above.

<Label Printer>

Figure 3:
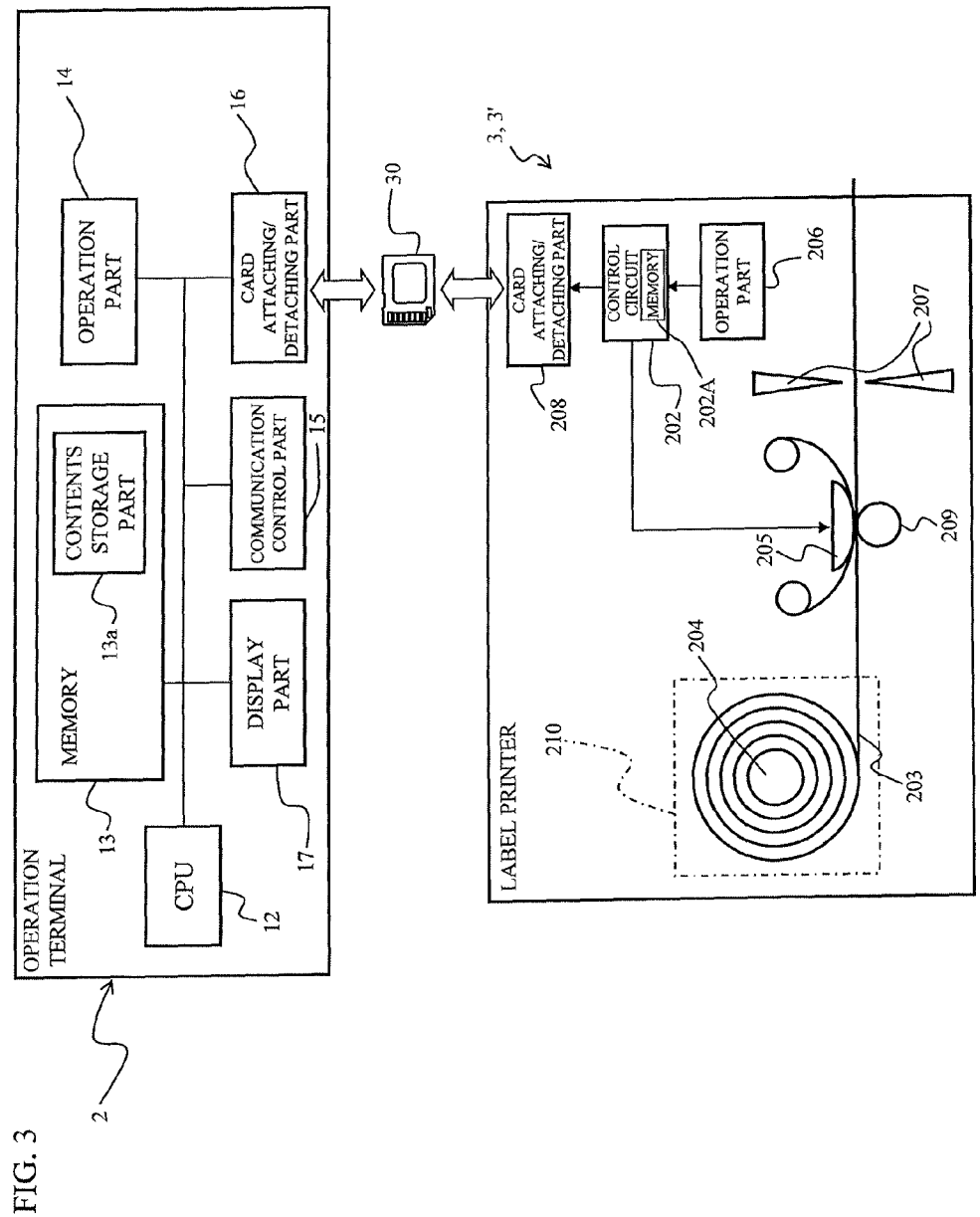
FIG. 3 is a function block diagram showing a detailed function of each part of the operation terminal and a label printer.

Hereinafter, the electrical configuration of the label printers 3 and 3' is explained with reference to FIG. 3. As shown in FIG. 3, the label printers 3 and 3' has a tape roll holder part 210 capable of attaching and detaching a tape roll 204 winding a tape 203 (print-receiving medium, which is a spiral in reality but is shown as a concentric circles for simplicity), (or capable of attaching and detaching a cartridge having the tape roll 204); a print head 205 (printing head) configured to perform desired printing on the tape 203 fed out from the tape roll 204; a cutter 7 configured to cut the tape 203 on which printing is completed into a desired length to produce the print label L; a feeding device 209 (feeder) provided so as to oppose the print head 205 and configured to feed the tape 203 from the tape roll 204 under the control of a control circuit 202; an operation part 206 to which instructions and information from an operator are input, similar to the operation part 14 of the above described operation terminal 2; and the card attaching/detaching part 208 (producing apparatus side attaching/detaching portion) capable of attaching and detaching the memory cart 30, which is configured by, for example, an SD slot etc.

<Template>

In the present embodiment, a plurality of kinds of so-called template, in which a plurality of print object arrangement frames is allocated in a predetermined mode, is provided in order to avoid the complicated operation performed by an operator to manually set print objects, such as text and figures, to be printed on the print label L. Then, in the large-capacity storage device 160 of the contents server SV, for example, the above described plurality of kinds of template (see FIG. 5, FIG. 6, FIG. 7, FIG. 8, etc., to be described later) produced and uploaded in advance are stored. Each template is read and downloaded from the large-capacity storage device 160 of the contents server SV by, for example, an appropriate operation of an operator at the operation part 14 of the operation terminal 2, and installed into the contents storage part 13a in the memory 13 of the operation terminal 2 via the network NW.

A control circuit 202 of the label printers 3 and 3' includes a memory 202A (see FIG. 3) and templates used in the label printer 3 or the label printer 3' are stored, for example, in the memory 202A. Further, in the memory 202A, when necessary, the history of production work information (number of times of printing, template categories used at the time of printing, etc) when the print label L is produced by the label printers 3 and 3', and label attribute information (number of times of printing for each of tape width, character color, tape color, etc., of the tape 203, that is, of the print label L, etc.) is stored as a use record. The contents of the stored use record (history) are updated (changed) at any time in accordance with the use of the label printers 3 and 3' whether the memory card 30 is attached to the card attaching/detaching part 208 or not (see also step MS10 in FIG. 8, to be described later).

It may also be possible to directly detect the above described label attribute information with a sensor, not shown schematically, corresponding to each attribute, or to indirectly acquire the label attribute information by detecting the kind of the attached tape roll 204 (or the above described cartridge) with a sensor provided in the above described tape roll holder part 210.

<Characteristics of the Present Embodiment>

The characteristics of the present embodiment lie in the template processing method in which the memory card 30 acquires templates from the operation terminal 2 having already acquired and stored a plurality of kinds of template from the contents server SV and stores, and further, the label printers 3 and 3' acquire the templates from the memory card in the manner described above. Hereinafter, details of the method are explained in order.

Comparative Example

First, as a comparative example of the method of the present embodiment, a case is explained where templates are acquired by directly connecting the operation terminal 2 and the label producing apparatus 3 (or 3').

Figure 4:
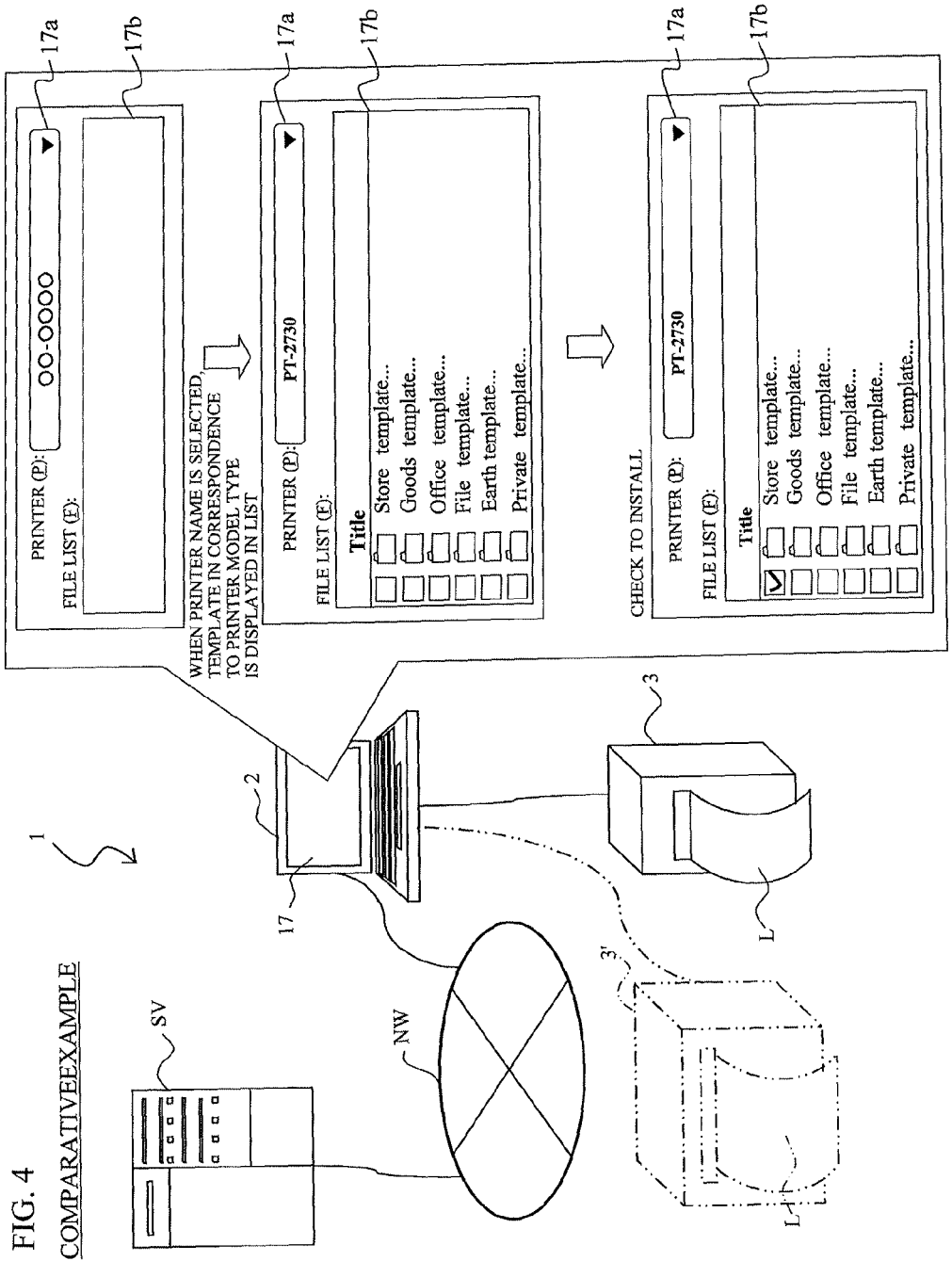
FIG. 4 is an explanatory diagram showing a comparative example in which template acquisition is performed by connecting the operation terminal and the label printer.

As shown in FIG. 4, in this example, the label printer 3 is connected to the operation terminal 2. In this example, when templates are acquired by the label printer 3, an operator selects the model type name (in this example, "PT-2730") of the label printer 3 in an equipment display box 17a displayed on the above described display part 17 of the operation terminal 2. As a result, templates corresponding to the model type name are searched for from all templates that the operation terminal 2 have acquired in advance from the contents server SV (or it may also be possible for the operation terminal 2 to access the contents server SV to search for templates in the contents server SV at this point of time instead of acquiring templates in advance). Then, the search result is displayed in a list in a list box 17b of the display part 17 of the operation terminal 2.

The operator selects a specific template that the operator desires to install into the label printer 3 from the templates displayed in the list as described above (in the example shown schematically, "Store" template is selected). As a result, the "Store" template is installed into the label printer 3 from the operation terminal 2 (or contents server SV). This is also the same when the label printer 3' is connected.

<Problem of Comparative Example>

When the label printer 3 (or 3') and the operation terminal 2 are connected directly and templates are searched for and acquired by inputting the model type name of the label printers 3 and 3' by an operation as in the above described comparative example, it is necessary for the operator to search for and specify, by a manual operation, a desired template that the operator intends to use from a number of templates displayed in the list in the above described list box 17b and further to perform the operation to cause the label printers 3 and 3' to acquire the specified template. As a result of that such a complicated operation is necessary, the burden of work of the operator increases, therefore the comparative example is very inconvenient for the operator.

<Outline of Method of the Present Embodiment>

In the present embodiment, transmission and reception of the template are performed using the memory card 30 as a medium without connecting the operation terminal 2 and the label printers 3 and 3'. At this time, by the label printers 3 and 3' writing main body information (to be described later) unique to each printer to the memory card 30 in advance, the number of kinds of template acquired by the memory card 30 from the operation terminal 2 is reduced by making use of the main body information. Hereinafter, such a method of the present embodiment is explained in detail.

<Flow of Template Acquisition of the Present Embodiment>

Figure 5:
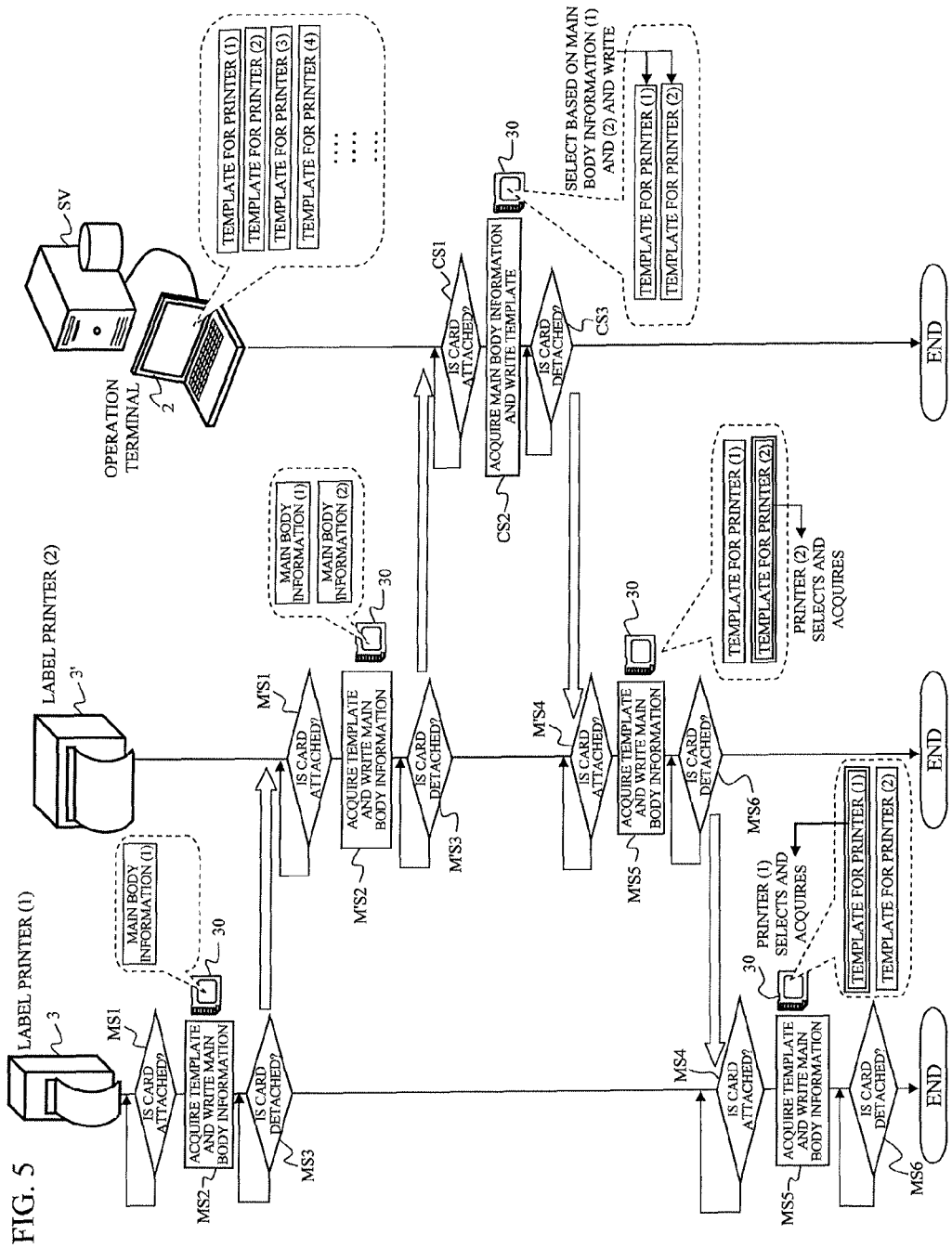
FIG. 5 is a sequence diagram showing a flow when templates are acquired from the operation terminal to the label printer.

In this example, a flow when template acquisition from the operation terminal 2 to the label printers 3 and 3' is performed in the case where there exist two label printers, that is, the label printer 3 (in FIG. 5, simply shown as "label printer (1)" and this also applies in the following) and the label printer 3' (in FIG. 5, simply shown as "label printer (2)" and this also applies in the following), is explained using a sequence diagram shown in FIG. 5. In FIG. 5, it is assumed that procedures change with time from the upper side toward the lower side and the relationship between states before and after a procedure is explained by schematically showing the procedures of the label printer 3 and the label printer 3', and the operation terminal 2 relating to the change with the time.

First, the above described control circuit 202 of the label printer 3 determines whether or not the memory card 30 is attached to the above described card attaching/detaching part 208 at step MS1. Until the memory card 30 is attached to the card attaching/detaching part 208, the result of the determination will be negative (MS1: NO) and the procedure stands by in loop. When an operator attaches the memory card 30 to the card attaching/detaching part 208, the result of the determination will be affirmative (MS1: YES) and the procedure moves to step MS2.

Subsequently, at step MS2, the control circuit 202 writes unique main body information (hereinafter, referred to as "main body information (1)" appropriately. In this example, the model type name or serial number of the label printer 3) as selection material information to select templates suitable for the label printer 3 to the above described card attached to the card attaching/detaching part 208. At step MS2, as at step MS5, to be described later, in the case where there exist templates already stored in the memory card 30 at this point of time and the template corresponding to the above described main body information (1) is included therein, it is also possible to acquire the template (for details, see step MS5, to be described later).

Subsequently, at step MS3, the control circuit 202 determines whether or not the memory card 30 to which the main body information is written at step MS2 is detached from the card attaching/detaching part 208. Until the memory card 30 is detached, the result of the determination will be negative (MS3: NO) and the procedure stands by in loop. When the operator detaches memory card 30 from the card attaching/detaching part 208, the result of the determination will be affirmative (MS3: YES) and the procedure moves to step MS4, to be described later.

On the other hand, the above described control circuit 202 of the label printer 3' determines whether or not the memory card 30 is attached to the above described card attaching/detaching part 208 at step M'S1 as in the above description. Until the memory card 30 is attached to the card attaching/detaching part 208, the result of the determination will be negative (M'S1: NO) and the procedure stands by in loop. When the operator attaches the memory card 30 detached from the card attaching/detaching part 208 of the label printer 3 in the manner described above to the card attaching/detaching part 208 of the label printer 3', the result of the determination will be affirmative (M'S1: YES) and the procedure moves to step M'S2.

Subsequently, at step M'S2, the control circuit 202 of the label printer 3' writes unique main body information (hereinafter, referred to as "main body information (2)" appropriately. In this example, the model type name or serial number of the label printer 3') as selection material information to select templates suitable for the label printer 3' to the memory card attached to the above described card attaching/detaching part 208 at step M'S2. As a result, both of the main body information of the above described label printer 3 and the main body information of the label printer 3' are stored to the memory card 30. At this step M'S2 also, as in the above description, in the case where the template corresponding to the above described main body information (2) is included at this point of time, it is also possible to acquire the template.

Subsequently, at step M'S3, the control circuit 202 of the label printer 3' determines whether or not the memory card 30 to which the main body information is written at step M'S2 is detached from the card attaching/detaching part 208. Until the memory card 30 is detached, the result of the determination will be negative (M'S3: NO) and the procedure stands by in loop. When the operator detaches the memory card 30 from the card attaching/detaching part 208, the result of the determination will be affirmative (M'S3: YES) and the procedure moves to step M'S4, to be described later.

On the other hand, at this point of time, the operation terminal 2 has periodically acquired a plurality of kinds of template different from one another including a template for the label printer 3 (in FIG. 5, simply shown as "template for printer (1)" and this also applies in the following) and a template for the label printer 3' (in FIG. 5, simply referred to as "template for printer (2)" and this also applies in the following) suitable for the above described label printers 3 and 3' and already stored the templates in the above described contents storage part 13*a*. In this state, the CPU 12 of the operation terminal 2 determines whether or not the memory card 30 is attached to the card attaching/detaching part 16 at step CS1. Until the memory card 30 is attached to the above described card attaching/detaching part 16, the result of the determination will be negative (CS1: NO) and the procedure stands by in loop. When the operator attaches the memory card 30 to which the main body information (1) and the main body information (2) of both the label printers 3 and 3' are written in the manner described above to the card attaching/detaching part 16, the result of the determination will be affirmative (CS1: YES) and the procedure moves to step CS2.

At step CS2, the CPU 12 of the operation terminal 2 acquires the above described main body information (1) and the main body information (2) from the memory card 30 attached to the card attaching/detaching part 16. Subsequently, the CPU 12 selects the template for the above described label printer 3 and the template for the label printer 3', respectively, corresponding to the above described main body information (1) and the main body information (2) from the plurality of kinds of template already stored in the contents storage part 13*a* as described above and writes the templates to the memory card 30. In the case where the contents storage part 13*a* is not provided in the operation terminal 2, it may also be possible to select and acquire the template for the above described label printer 3 and the template for the label printer 3' corresponding to the above described main body information (1) and the main body information (2) from the contents server SV and write the templates to the memory card 30 at step CS2. In this case, the operation terminal 2 and the contents server SV function as a contents supply apparatus according to each claim. The above described large-capacity storage device 160 of the contents server SV functions as a memory according to each claim.

Subsequently, at step CS3, the CPU 12 determines whether or not the memory card 30 to which the template for the label printer 3 and the template for the label printer 3' are written at step CS2 is detached from the card attaching/detaching part 16. Until the memory card 30 is detached, the result of the determination will be negative (CS3: NO) and the procedure stands by in loop. When the operator detaches the memory card 30 from the card attaching/detaching part 16, the result of the determination will be affirmative (CS3: YES), thereby the processing on the operation terminal 2 side is completed.

At this time, as described above, the above described control circuit 202 of the label printer 3' determines whether or not the memory card 30 is attached to the card attaching/detaching part 208 at step M'S4. Until the memory card 30 is attached to the card attaching/detaching part 208, the result of the determination will be negative (M'S4: NO) and the procedure stands by in loop. When the operator attaches the memory card 30, to which the template for the label printer 3 and the template for the label printer 3' are written in the manner described above and which is detached from the card attaching/detaching part 16 of the operation terminal 2, to the card attaching/detaching part 208, the result of the determination will be affirmative (M'S4: YES) and the procedure moves to step M'S5.

Subsequently, at step M'S5, the control circuit 202 of the label printer 3' acquires templates written to and stored in the memory card 30 from the memory card 30 attached to the above described card attaching/detaching part 208 at step M'S4. At this time, the control circuit 202 selects and acquires the only template for the label printer 3' corresponding to the main body information of the label printer 3' (that is, the main body information (2) in this example) from the plurality of kinds of template (in this example, the template for the label printer 3 and the template for the label printer 3') stored in the memory card 30. That is, the control circuit 202 acquires the only template suitable for the label printer 3', ignoring the other template corresponding to the label printer 3 (a kind of template assorting function). At this step M'S5, as at step MS2 and step M'S2 described above, it is also possible to write the main body information (2) of the label printer 3' to the memory card 30.

Subsequently, at step M'S6, the control circuit 202 of the label printer 3' determines whether or not the memory card 30 having acquired the template for the label printer 3' at above described step M'S5 is detached from the card attaching/detaching part 208. Until the memory card 30 is detached, the result of the determination will be will be negative (M'S6: NO) and the procedure stands by in loop. When the operator detaches the memory card 30 from the card attaching/detaching part 208, the result of the determination will be will be affirmative (M'S6: YES), thereby the processing on the label printer 3' side is completed.

At this time, as described above, the above described control circuit 202 of the label printer 3 determines whether or not the memory card 30 is attached to the card attaching/detaching part 208 at step MS4. Until the memory card 30 is attached to the card attaching/detaching part 208, the result of the determination will be negative (MS4: NO) and the procedure stands by in loop. When the operator attaches the memory card 30, which stores the template for the label printer 3 and the template for the label printer 3' and which is detached from the card attaching/detaching part 208 of the label printer 3' in the manner described above, to the card attaching/detaching part 208, the result of the determination will be affirmative (MS4: YES) and the procedure moves to step MS5.

Subsequently, at step MS5, the control circuit 202 of the label printer 3 acquires templates stored in the memory card 30 from the memory card 30 attached to the above described card attaching/detaching part 208 at step MS4. At this time, as in the above description, the control circuit 202 selects and acquires the only template for the label printer 3 corresponding to the main body information of the label printer 3 (that is, the main body information (1) in this example) from the plurality of kinds of template (in this example, the template for the label printer 3 and the template for the label printer 3') stored in the memory card 30. That is, as in the above description, the control circuit 202 acquires the template suitable for the label printer 3 (a kind of template assorting function as in the above description), ignoring the other template corresponding to the label printer 3'. At this step MS5 also, as at steps MS2 and M'S2 described above, it is also possible to write the main body information (1) of the label printer 3 to the memory card 30.

Subsequently, at step MS6, the control circuit 202 of the label printer 3 determines whether or not the memory card 30 having acquired the template for the label printer 3 at step MS5 is detached from the card attaching/detaching part 208. Until the memory card 30 is detached, the result of the determination will be negative (MS6: NO) and the procedure stands by in loop. When the operator detaches the memory card 30 from the card attaching/detaching part 208, the result of the determination will be affirmative (MS6: YES), thereby the processing on the label printer 3 side is completed. That is, all processing in this sequence diagram is completed.

As explained above, in the label printer 3 and the label printer 3' of the present embodiment, by using the memory card 30 as a medium, it is possible to easily perform transmission and reception of templates with the operation terminal 2 without the need to make various kinds of connections via wired and wireless communication. At this time, when transmission and reception of templates are performed with the operation terminal 2 via the memory card 30, the above described main body information (1) and the main body information (2) unique to the label printers 3 and 3' are written to the memory card 30 from the label printers 3 and 3'. Then, by making use of these main body information (1) and (2), it is possible to introduce the only templates suitable for the label printers 3 and 3' when introducing the templates from the operation terminal 2 into the label printers 3 and 3' via the memory card 30. The label printer 3 and the label printer 3' select and acquire the template corresponding to the main body information (1) or the main body information (2) from the plurality of kinds of template already written to and stored in the memory card 30 from the operation terminal 2. As a result, template acquisition is performed in the mode in which templates are reduced in number to templates suitable for the label printers 3 and 3' or priority is given thereto, in other words, in the mode in which unnecessary templates are excluded.

As a result of this, even though the template storage capacity (capacity of the above described memory 202A) in the label printers 3 and 3' is small, it is possible to securely introduce templates with high possibility to use by the operator into the label printers 3 and 3' and to use the templates. Further, in the present embodiment, as a result of that the complicated operation is made no longer necessary as described above by making use of the main body information (1) and (2), it is possible to remarkably reduce the burden of operation for the operator and to improve convenience.

In the present embodiment, in particular, the model type and serial number of the label printers 3 and 3' are written to the memory card 30 as main body information. As a result, it is possible to acquire and use templates while excluding templates that do not agree with the specifications, performance, and unique use history of the label printers 3 and 3'.

In the present embodiment, in particular, the operation terminal 2 is connected to the contents server SV, which is a web server, therefore it is possible for the label printer 3 and the label printer 3' to acquire templates stored on the web (including a so-called cloud) via the operation terminal 2 and the memory card 30.

In the operation terminal 2 of the present embodiment, at step CS2, templates corresponding to the main body information stored in the memory card 30 (in the example described above, the main body information (1)) are selected from the plurality of kinds of template stored in the contents storage part 13a of the memory 13 of the operation terminal 2 and written. As a result, at the point of time when the memory card 30 acquires templates from the operation terminal 2, template acquisition is performed in the mode in which templates are reduced in number to the templates for the label printer 3 and for the label printer 3' suitable for the label printer 3 and the label printer 3' (in other words, in the mode in which unnecessary templates are excluded). As a result, as described above, even though the template storage capacity in the label printers 3 and 3' is small, it is possible to securely introduce templates with high possibility to use by the operator into the label printers 3 and 3' and use.

The present disclosure is not limited to the above described embodiment and various modifications can be made within the scope not deviating from the gist and technical idea thereof. Hereinafter, such modification examples are explained.

Modification Example (1)

Case where Use Record is Written as Main Body Information

In the above described embodiment, as the main body information (selection material information) unique to each printer, the model type name or serial number of the label printer 3 is used, however, this is not limited and another piece of information may be used. Hereinafter, such a modification example is explained referring to FIG. 6.

<Flow of Template Acquisition of the Present Modification Example>

Figure 6:
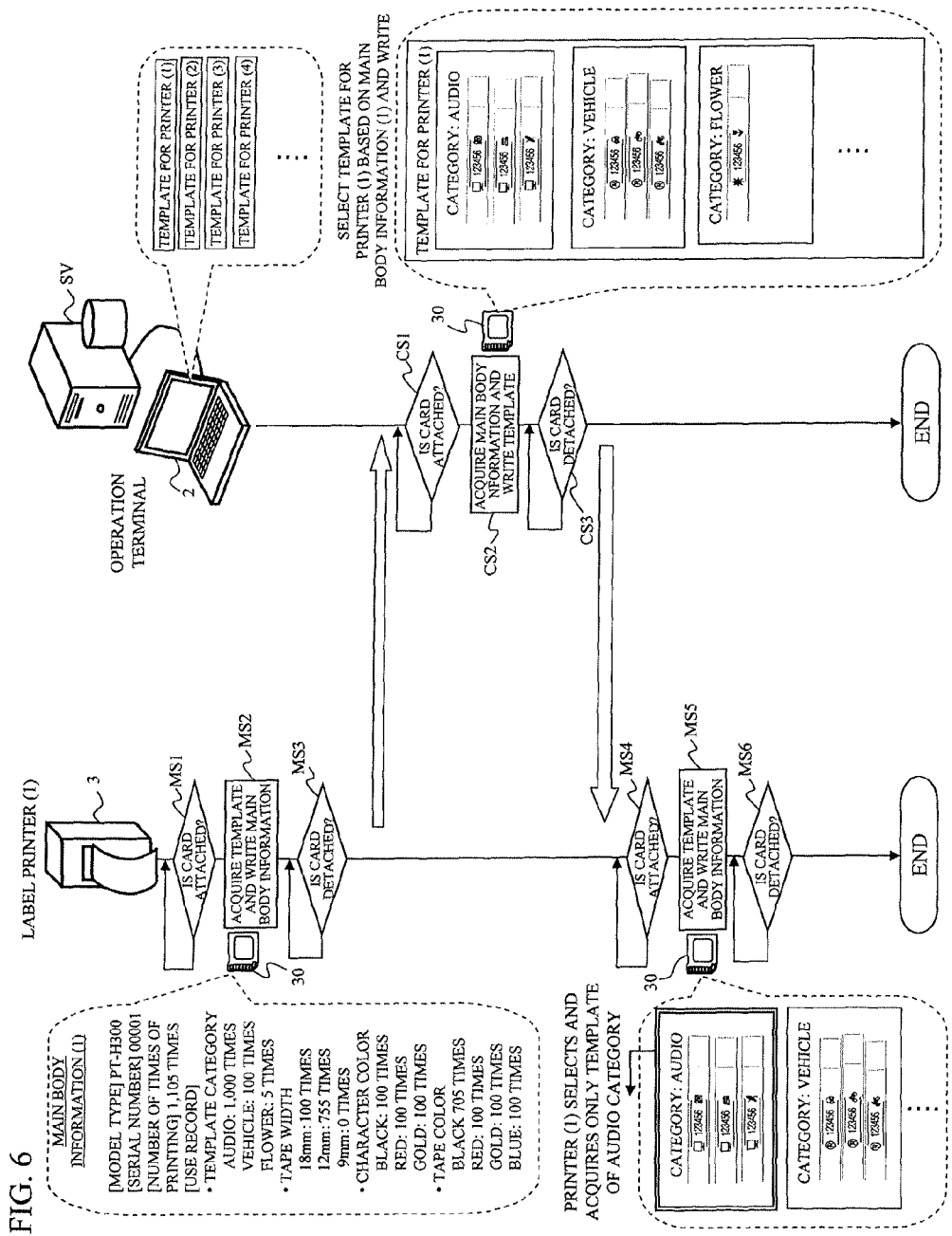
FIG. 6 is a sequence diagram showing a flow when templates are acquired from the operation terminal to the label printer in a modification example in which a use record is written as main body information.

In the present modification example, a flow when template acquisition from the operation terminal 2 to the label printer 3 is performed in the case where there exists one label printer, that is, the label printer 3 (in FIG. 6, simply shown as "label printer (1) and this also applies in the following) is explained referring to a sequence diagram shown in FIG. 6. In FIG. 6, as in the above case of FIG. 5, it is assumed that procedures change with time from the upper side toward the lower side and the relationship between states before and after a procedure is explained by schematically showing the procedures of the label printer 3 and the operation terminal 2 relating to the change with the time. The same symbols are attached to the part equivalent to those in above described FIG. 5 of the above described embodiment and explanation thereof is appropriately omitted or simplified.

In FIG. 6, in the present modification example, at step MS2, the main body information (1) including, for example, "Model type name", "Serial number", "Number of times of printing", and "Use record" stored in the above described memory part 202A is written to the memory card 30 whose attachment to the card attaching/detaching part 208 of the label printer 3 has been checked at step MS1. As described above, when there exist templates already stored in the memory card 30 at this point of time and the template corresponding to the above described main body information (1) is included therein, it is also possible to acquire the template at this step MS2.

In more detail, "Use record" described above includes various kinds of use record (use history), such as "Template category" use record, "Tape width" use record indicating the label attribute, "Ribbon character color" use record, and "Tape color" use record. For example, the "Template category" use record includes information indicating that "Audio" category is used 1,000 times, "Vehicle" category is used 100 times, "Flower" category is used 5 times, etc. That is, the "Audio", "Vehicle", and "Flower" categories are the top three categories in terms of use frequency of all categories.

When the memory card 30 to which the main body information (1) including "Model type name", "Use record", etc., is written as described above is attached to the card attaching/detaching part 16 of the operation terminal 2 after the memory card 30 is detached from the card attaching/detaching part 208 of the label printer 3 by an operator as in the above description, the result of the determination at step CS1 performed by the CPU 12 of the operation terminal 2 will be affirmative and the procedure moves to step CS2.

In the present modification example, at step CS2, the CPU 12 of the operation terminal 2 acquires the main body information (1) including above described "Model type name", "Use record", etc., from the memory card 30 attached to the card attaching/detaching part 16. Subsequently, the CPU 12 selects and writes the template for the label printer 3 corresponding to the above described main body information (1) from the plurality of kinds of template already stored in the contents storage part 13a as described above. At this time, the template for the label printer 3 includes all categories (including categories other than the top three categories, i.e., the above described "Audio", "Vehicle", and "Flower" categories). At this step CS2, it may also be possible to select and write the only templates of the top three categories in terms of use record, that is, the "Audio", "Vehicle", and "Flower" categories instead of wiring all categories as described above.

Subsequently, when the operator attaches the memory card 30, to which the templates for the label printer 3 of all categories are written in the manner described above, to the card attaching/detaching part 208 of the label printer 3, as in the above description, the result of the determination at step MS4 will be affirmative (MS4: YES) and the procedure moves to MS5.

At step MS5, the control circuit 202 of the label printer 3 selects and acquires the only template corresponding to the main body information of the label printer 3 (that is, the main body information (1) in this example) from the plurality of kinds of template (in this example, templates for the label printer 3 within all categories) stored in the memory card 30. In this example, the control circuit 202 selects (a kind of template number reducing function) and acquires the only template of the category "Audio" whose use frequency described above is the highest. At this step MS5, as at the case of the above described step MS2 described above, it is also possible to write the main body information (1) of the label printer 3 most recent at this point of time to the memory card 30.

In the present modification example as described above, it is also possible to obtain the same effect as that of the above described embodiment. That is, in the label printer 3 of the present embodiment, when transmission and reception of templates are performed with the operation terminal 2 via a medium, the main body information (1) unique to the label printer 3 is written to the memory card 30. Then, by making use of the main body information (1), it is possible to preferentially introduce the template suitable for the label printer 3 (in this example, the template of the "Audio" category whose use frequency is the highest) when introducing templates from the operation terminal 2 into the label printer 3 via the memory card 30. As a result, it is possible to acquire templates in the mode in which priority is given to templates suitable for the label printer 3, in other words, in the mode in which priority is not given to unnecessary templates. As a result of this, as in the above description, even though the template storage capacity (capacity of the above described memory 202A) in the label printer 3 is small, it is possible to securely introduce templates with high possibility to use by the operator into the label printer 3 and use.

In the present embodiment, in particular, as the main body information, the production work information in the production history of the print label L in the label printer 3 (in this example, the use record for each template category) is written to the memory card 30 for use. As a result, as described above, it is possible to securely introduce and use the only templates with high possibility to use by the operator based on the past use record in the label printer 3. It may also be possible to use the label attribute information (number of times of printing etc., for each of tape width, character color, tape color, etc., of the tape 203, i.e., the print label L) included in the above described main body information (1) in place of the use record for each of the above described template categories. In this case, it may also be possible to select and write the only templates corresponding to those having a high use record of tape width, character color, tape color, etc., at above described CS2 performed by the CPU 12 of the operation terminal 2. Alternately, it may also be possible to select and acquire the only templates corresponding to those having a high use record of the above described tape width, character color, tape color, etc., at step MS5 performed by the control circuit 202 of the label printer 3. In the above cases, it is also possible to securely introduce and use the only templates with high possibility to use for the operator based on the past use record in the label printer 3.

In the present modification example, it is also possible to newly update the above described main body information (1) by further producing the print label L after attaching the memory card 30 to the card attaching/detaching part 208 of the label printer 3 and introducing templates into the label printer 3 in the manner described above. That is, each time the print label L is produced newly, the label attribute information (number of times of printing etc., for each of tape width, character color, tape color, etc., of the tape 203, i.e., the print label L) and the production work information (number of times of printing, use record for each template category, etc) included in the main body information (1) are newly updated as a result. In this case, it is possible for the operator to perform again, as described above, transmission and reception of templates from the operation terminal 2 to the label printers 3 and 3' via a medium again using the above described updated main body information by detaching the memory card 30 storing the above described updated main body information from the card attaching/detaching part 208 after the production of the print label L is completed. By repeating this performance, it is also possible to securely introduce optimum templates for the label printers 3 and 3' at that point of time into the label printers 3 and 3' from the operation terminal 2 each time the label printers 3 and 3' are used.

Modification Example (2)

Case where Two Label Printers of the Same Model Type but with Different Serial Numbers are Used In the above described embodiment, the case where templates are introduced into the two label printers 3 and 3' of different model types is explained as an example, however, this is not limited and it may also be possible to apply the embodiment to introduction of templates into two label printers of the same model type. Hereinafter, such a modification example is explained referring to FIG. 7.

<Flow of Template Acquisition in the Present Modification Example>

Figure 7:
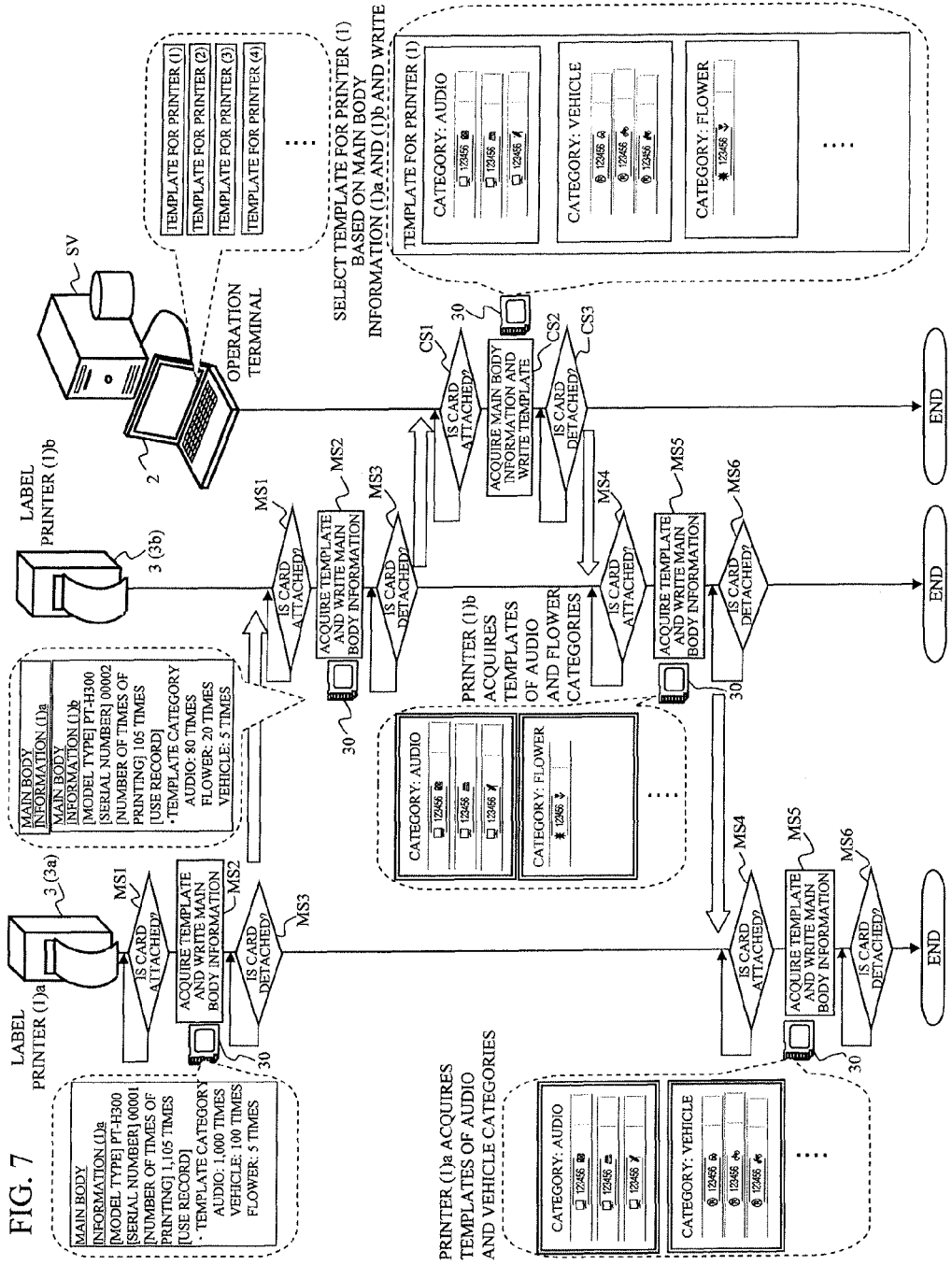
FIG. 7 is a sequence diagram showing a flow when templates are acquired from the operation terminal to the label printer in a modification example in which two label printers of the same model type but with different serial numbers are used.

In the present modification example, a flow when template acquisition from the operation terminal 2 to the label printers 3 and 3' is performed in the case where there exist two label printers of the same model type but with different serial numbers, that is, the label printers 3 and 3, is explained referring to a sequence diagram shown in FIG. 7. One of the two label printers 3 and 3 shown on the left side in FIG. 7 is referred to as a "label printer 3a" and simply shown as "label printer (1)a" in FIG. 7 for convenience of explanation. The other of the two label printers 3 and 3 shown on the right side in FIG. 7 is referred to as a "label printer 3b" and simply shown as "label printer (1)b" in FIG. 7 for convenience of explanation. Then, as in the above description, it is assumed that procedures change with time from the upper side toward the lower side in FIG. 7 and the relationship between states before and after a procedure is explained by schematically showing the procedures of the label printers 3a and 3b and the operation terminal 2 relating to the change with the time. The same symbols are attached to parts equivalent to those in the above described FIG. 5 of the above described embodiment and in the above described FIG. 6 of the modification example (1) and explanation thereof is appropriately omitted or simplified.

In FIG. 7, in the present modification example, first, at step MS2 performed by the control circuit 202 of the label printer 3a, for example, main body information (1)a stored in the above described memory part 202A is written to the memory card 30 whose attachment to the card attaching/detaching part 208 has been checked at step MS1. The main body information (1)a includes the model type name (in this example, "PT-H3000"), the serial number (in this example, "00001"), the number of times of printing (in this example, "1,105 times"), the use record (in this example, the "Audio" category is used 1,000 times, the "Vehicle" category 100 times, the "Flower" category 5 times, . . . ), etc. That is, as to the label printer 3a, the "Audio" and "Vehicle" categories are the top two categories in the order from the highest use frequency of all categories. As described above, in the case where the template corresponding to the above described main body information (1)a is included in the memory card 30 at this point of time, it is also possible to acquire the template at this step MS2.

Subsequently, when the operator detaches the memory card 30 to which the above described main body information (1)a is written from the card attaching/detaching part 208 of the label printer 3a and attaches the memory card 30 to the card attaching/detaching part 208 of the label printer 3b, for example, main body information (1)b stored in the above described memory part 202A is written to the memory card 30 at step MS2 performed by the control circuit 202 of the label printer 3b. The main body information (1)b includes the model type name (in this example, "PT-H3000"), the serial number (in this example, "00002"), the number of times of printing (in this example, "105 times"), the use record (in this example, the "Audio" category is used 80 times, the "Flower" category 20 is used times, the "Audio" category 5 is used times, . . . ), etc. That is, as to the label printer 3b, the "Audio" and "Vehicle" categories are the top two categories in the order from the highest use frequency of all categories. As described above, in the case where the template corresponding to the main body information (1)b is included in the memory card 30 at this point of time, it is also possible to acquire the template at this step MS2.

When the memory card 30, to which the main body information (1)a is written in the label printer 3a and to which the main body information (1)b is written in the label printer 3b in the manner described above, is attached to card attaching/detaching part 16 of the operation terminal 2 after the memory card 30 is detached from the card attaching/detaching part 208 of the label printer 3b by the operator, as in the above description, the result of the determination at step CS1 performed by the CPU 12 of the operation terminal 2 will be affirmative and the procedure moves to step CS2.

In the present modification example, at step CS2, the CPU 12 of the operation terminal 2 acquires the above described main body information (1)a and the main body information (1)b from the memory card 30 attached to the card attaching/detaching part 16. Subsequently, as described above, the CPU 12 selects and writes the templates for the label printers 3a and 3b corresponding to the main body information (1)a and the main body information (1)b from the plurality of kinds of template already stored in the contents storage part 13a. At this time, in the template for the label printer 3, all categories (including categories other than the above described "Audio", "Vehicle", and "Flower" categories) are included. It may also be possible to select and write the only templates of "Audio", "Vehicle", and "Flower" that are common to both the top two categories in terms of use record, that is, "Audio" and "Vehicle" in the main body information (1)a and the top two categories in terms of use record, that is, "Audio" and "Flower" in the main body information (1)b instead of writing all categories as described above at this step CS2.

Subsequently, when the operator attaches the memory card 30, to which the templates for the label printer 3 of all categories are written in the manner described above, to the card attaching/detaching part 208 of the label printer 3b, as in the above description, the result of the determination at step MS4 performed by the control circuit 202 of the label printer 3b will be affirmative (MS4: YES) and the procedure moves to step MS5.

At step MS5, the control circuit 202 of the label printer 3b selects and acquires the only templates corresponding to the main body information of the label printer 3b (that is, the main body information (1)b in this example) from the plurality of kinds of template (in this example, templates for the label printer 3 of all categories or templates of the three "Audio", "Vehicle", and "Flower" categories) stored in the memory card 30. In this example, the control circuit 202 selects (a kind of template number reducing function, and also a kind of template assorting function with considering contrast with the label printer 3a to be described later) and acquires the only templates of the two "Audio" and "Flower" categories in the order from the highest use frequency described previously. It is also possible to write the main body information (1)b of the label printer 3b most recent at this point of time to the memory card 30 at this step MS5.

Subsequently, when the operator detaches the memory card 30 from the card attaching/detaching part 208 of the label printer 3b and attaches the memory card 30 to the card attaching/detaching part 208 of the label printer 3a, as in the above description, the result of the determination at step MS4 performed by the control circuit 202 of the label printer 3a will be affirmative (MS4: YES) and the procedure moves to step MS5.

At step MS5, the control circuit 202 of the label printer 3a selects and acquires the only templates corresponding to the main body information of the label printer 3a (that is, the main body information (1)a in this example) from the plurality of kinds of template (in this example, templates for the label printer 3 of all categories or templates of the three "Audio", "Vehicle", and "Flower" categories) stored in the memory card 30. In this example, the control circuit 202 selects (a kind of template number reducing function, and also a kind of template assorting function with considering contrast with the label printer 3b described previously) and acquires the only templates of the two "Audio" and "Vehicle" categories in the order from the highest use frequency described previously. It is also possible to write the main body information (1)a of the label printer 3a most recent at this point of time to the memory card 30 at this step MS5.

In the present modification example as described above, it is also possible to obtain the same effect as that of the above described embodiment. That is, in the label printers 3a and 3b of the present embodiment, when transmission and reception of templates are performed with the operation terminal 2 via a medium, the main body information (1)a or (1)b unique to the label printer 3 is written to the memory card 30. Then, by making use of the main body information (1)a and (1)b, it is possible to preferentially introduce the templates suitable for the label printer 3a and 3b (to the label printer 3a, the templates of the top two "Audio" and "Vehicle" categories in terms of use frequency; and to the label printer 3b, the templates of the top two "Audio" and "Flower" categories in terms of use frequency) when introducing templates from the operation terminal 2 into the label printers 3a and 3b via the memory card 30. As a result, it is possible to acquire templates in the mode in which priority is given to templates suitable for the label printers 3a and 3b, in other words, in the mode in which priority is not given to unnecessary templates. As a result of this, as in the above description, even though the template storage capacity (capacity of the above described memory 202A) in the label printers 3a and 3b is small, it is possible to securely introduce templates with high possibility to use for the operator into the label printers 3a and 3b and use.

In the present modification example also, as in the above described modification example (1), it is possible to newly update the above described main body information (1)a and (1)b and to obtain the same effect by further producing the print label L after attaching the memory card 30 to the card attaching/detaching part 208 of the label printers 3a and 3b and introducing templates into the label printers 3a and 3b in the manner described above.

Modification Example (3)

Case where Template Corresponding to Main Body Information Updated after Memory Card is Detached is Acquired <Flow of Template Acquisition in the Present Modification Example>

Figure 8:
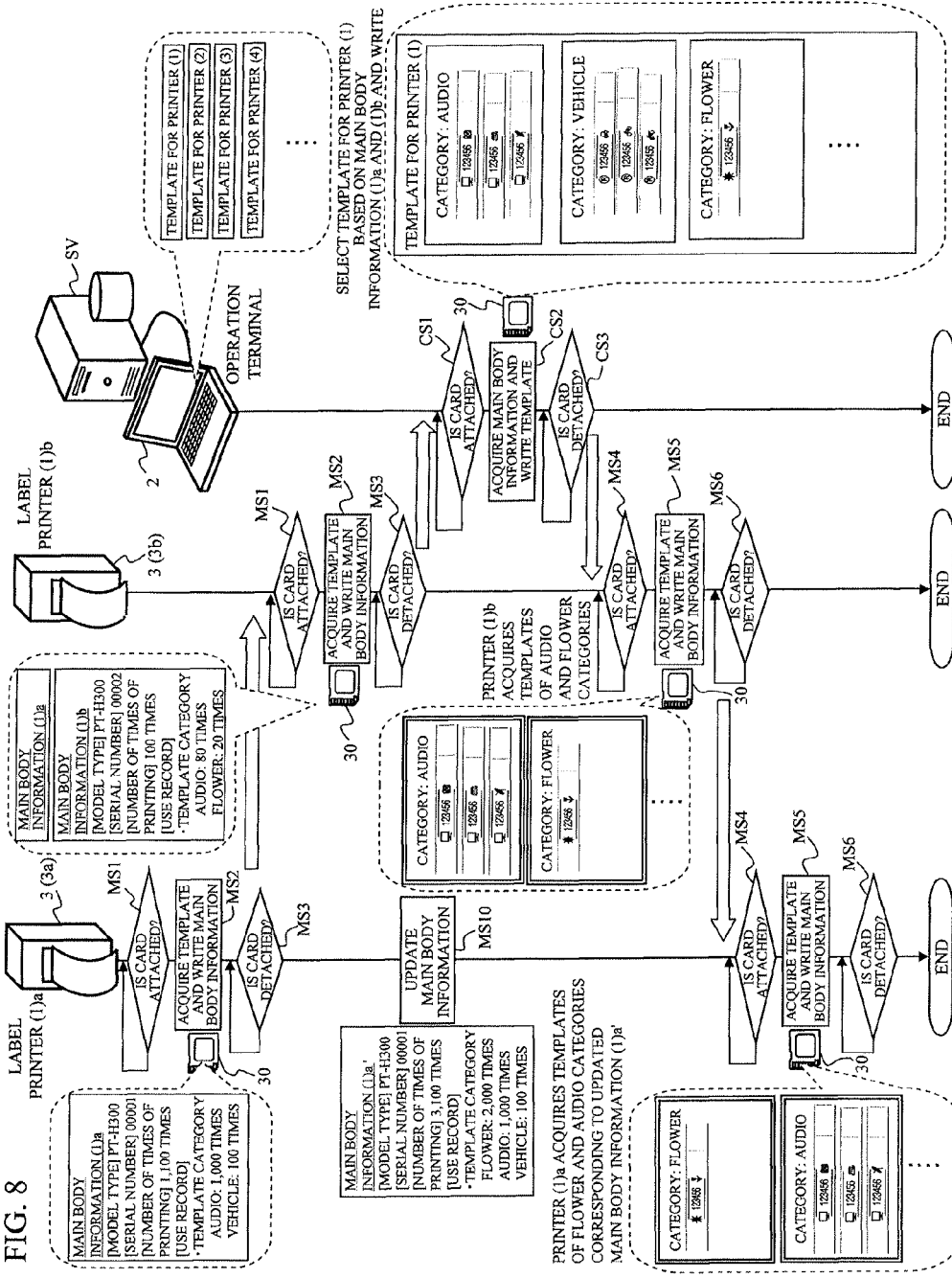
FIG. 8 is a sequence diagram showing a flow when templates are acquired from the operation terminal to the label printer in another modification example in which two label printers of the same model type but with different serial numbers are used.

In the present modification example, as in the above described modification example (2), the case where there exist two label printers of the same model type but with different serial numbers, that is, the two label printers 3 and 3', is taken to be an example and a flow when template acquisition from the operation terminal 2 to the label printers 3 and 3 is performed is shown in FIG. 8.

In a sequence shown in FIG. 8, step MS10 is provided newly between step MS3 and step MS4 performed by the control circuit 202 of the label printer 3a (corresponding to a first print label producing apparatus) in the sequence shown in FIG. 7. The processing contents of the other procedures are substantially equivalent to the processing of each procedure shown in FIG. 7, therefore explanation thereof is appropriately omitted or simplified.

That is, at step MS2 performed by the control circuit 202 of the label printer 3a, for example, the main body information (1)a described above (corresponding to first selection material information) stored in the above described memory part 202A is written to the memory card 30 whose attachment to the card attaching/detaching part 208 has been checked at step MS1. In this example, the main body information (1)a includes the model type name "PT-H3000", the serial number "00001", the number of times of printing "1,100 times", and the use record ("Audio" category is used 1,000 times, and "Vehicle" category is used 100 times). That is, as to the label printer 3a, the "Audio" and "Vehicle" categories are the top two categories in the order from the highest use frequency at this point of time.

Subsequently, as in the case of FIG. 7, when the memory card 30 to which the above described main body information (1)a is written is attached to the card attaching/detaching part 208 of the label printer 3b (corresponding to a second print label producing apparatus), at step MS2, as in the above description, the main body information (1)b (corresponding to second selection material information) is written to the memory card 30. In this example, the main body information (1)b includes the model type name "PT-H3000", the serial number "00002", the number of times of printing "100 times", and the use record (in this example, "Audio" category is used 80 times, "Flower" category is used 20 times). That is, as to the label printer 3b, the "Audio" and "Flower" categories are the top two categories in the order from the highest use frequency. The above described step MS1 corresponds to a second producing apparatus side determination step; and step MS2 corresponds to a second selection information write step.

When the memory card 30 to which the main body information (1)a and the main body information (1)b are written as described above is attached to the card attaching/detaching part 16, as in the above description, the procedure moves to step CS2 through step CS1. At step CS2, as in the above description, after the above described main body information (1)a and the main body information (1)b are acquired from the memory card 30, the templates for the label printers 3a and 3b corresponding thereto are selected and written. In this example, the only templates of the "Audio", "Vehicle", and "Flower" category serving both the two top categories in the use record, that is, the "Audio" category and the "Vehicle" category in the main body information (1)a and the two top categories in the use record, that is, the "Audio" category and the "Flower" category are selected and written. The above described step CS1 corresponds to a supply apparatus side determination step and step CS2 corresponds to a contents write step.

Subsequently, as in FIG. 7, when the memory card 30 to which the templates for the label printer 3 of the "Audio", "Vehicle", and "Flower" categories are written is attached to the card attaching/detaching part 208 of the label printer 3b, the procedure moves to step MS5 through step MS4 as in the above description. At step MS5, as in the above description, the label printer 3b selects and acquires the only templates of the two "Audio" and "Flower" categories corresponding to the main body information of the label printer 3b (that is, the main body information (1)b in this example) from the templates of the three "Audio", "Vehicle", and "Flower" categories stored in the memory card 30. The above described step MS4 corresponds to a third producing apparatus side determination step and step MS5 corresponds to a first contents acquisition step.

After the above described step MS5, the operator detaches the memory card 30 from the card attaching/detaching part 208 and attaches the memory card 30 to the card attaching/detaching part 208 of the label printer 3a.

At this time, in the present modification example, after the memory card 30 is detached from the card attaching/detaching part 208 at step MS3 described previously after the main body information (1)a is written thereto, when the print label L is produced in the label printer 3a, (or by an appropriate operation of the operator), at least part of the contents of the main body information (1)a described above are changed (updated) at step MS10 which is provided as the above described new step MS10. In this example, after the state described previously, printing with 2,000 time (label production) using the template of the "Flower" category is performed additionally. As a result of this, in the main body information (1)a' after the above described update, the number of times of printing becomes "3,100 times" and the use record of the top two categories becomes that the "Flower" category is used 2,000 times and the "Audio" category is used 1,000 times. That is, in the label printer 3a, the top two categories have changed to the "Flower" and "Audio" categories at this point of time. The above described step MS10 corresponds to a selection information update step and the above described updated main body information (1)a' described above corresponds to third selection material information.

Here, the "Flower" category whose the above described use frequency is the highest is not included in the main body information (1)a of the label printer 3a written at step MS3 described previously. However, in the example described above, the "Flower" category is included by chance in the main body information (1)b of the label printer 3b written to the memory card 30 at the above described step MS2. As a result of this, the template of the "Flower" category is also written to and stored in the memory card 30 at the above described step CS2. As a result of this, at step MS5 performed after step MS4 in the label printer 3a through attachment of the above described memory card 30, it is possible for the label printer 3a to select and acquire the templates corresponding to the above described updated main body information (1)a' (in this example, templates of the two "Flower" and "Audio" categories in the order from the highest use frequency) from the templates of the three "Audio", "Vehicle", and "Flower" categories stored in the memory card 30. The above described step MS4 corresponds to a fourth producing apparatus side determination step and step MS5 corresponds to a second contents acquisition step.

In the present modification example as described above, it is also possible to obtain the same effect as that of the above described embodiments. Further, after the main body information (1)a is written to the memory card 30 in the label printer 3a, even though the contents of the main body information (1)a are updated, as described previously, the templates corresponding to the updated main body information (1)a' are acquired by the label printer 3a. That is, it is possible to introduce templates suitable for the most recent state of the label printer 3a, therefore it is possible to further improve convenience.

Modification Example (4)

Case where Alarm Display Step is Performed

As explained in the above embodiment and modification examples (1), (2), and (3), in order to perform the above described method efficiently, it is necessary to attach the memory card 30 to the label printer 3 (or label printer 3') prior to the operation terminal 2. Consequently, in the present modification example, in the case where the memory card 30 is determined to be attached at step CS1 performed by the CPU 120 of the above described operation terminal 2 but the main body information cannot be acquired at subsequent step CS2, by an alarm display step (not shown schematically) provided newly, a display control signal for producing a corresponding alarm display is output to the display part 17. As a result, if an operator erroneously attaches the memory card 30 to the card attaching/detaching part 16 of the operation terminal 2 instead of attaching the memory card 30 to the label printers 3 and 3', it is possible to alarm that "the memory card 30 needs to be attached to the label printers 3 and 3' first". Further, in correspondence to this function (or separately from this function), it may also be possible to display the name and contents of the template to be written in correspondence to the above described main body information on the above described display part 17 of the operation terminal 2 when the memory card 30 is attached so that the operator may check using an appropriate "check button" etc.

Modification Examples (5)

Others

In the above described examples, as the example of the contents supply apparatus, the operation terminal 2 connected to the contents server SV is explained, however, this is not limited. That is, it may also be possible to use a large-capacity storage device etc. storing a number of templates as the contents supply apparatus in a state of being not connected to a network in particular and to perform transmission and reception of templates with the above described label printers 3 and the label printer 3' using the memory card 30 as a medium. In this case also, the same effect is obtained.

In the above described example, as the example of the contents, the templates used at the time of label production are explained; however, this is not limited. That is, objects to be subjected to processing of the present disclosure may be various kinds of contents, such as images used in relation to production of other labels and software, such as an OS, applications, and various kinds of drivers. In this case also, the same effect is obtained.

In the above, the sequences and flows shown in FIG. 5, FIG. 6, FIG. 7, FIG. 8, etc., are not intended to limit the present disclosure to the procedures shown in each figure and it may also be possible to add, delete, change the order of the procedures, etc., within the scope not deviating from the gist and the technical idea of the disclosure.

In addition to those already described above, it may also be possible to make use of the methods by the above described embodiment and each of the modification examples in an appropriate combination.

Although not illustrated here individually, the present disclosure is embodied with various modifications being made thereto within the scope not deviating from the gist thereof.

What is claimed is:
1. A contents processing method comprising:
 a first determination step for determining whether or not a nonvolatile storage device is attached to a producing apparatus side attaching/detaching portion provided in a print label producing apparatus configured to produce a print label by forming a print on a print-receiving medium;
 a selection information write step for writing unique selection material information to select said contents suitable for the print label producing apparatus to said storage device in an attached state when it is determined that said storage device is attached to said producing apparatus side attaching/detaching portion of said print label producing apparatus in said first determination step;

a second determination step for determining whether or not said storage device storing said selection material information written in said selection information write step is attached to a supply apparatus side attaching/detaching portion provided in a contents supply apparatus;

a contents write step for writing at least part of a plurality of kinds of contents different from one another stored in a memory of said contents supply apparatus to said storage device in a state of being attached to said supply apparatus side attaching/detaching portion when it is determined that said storage device is attached to said supply apparatus side attaching/detaching portion in said second determination step;

a third determination step for determining whether or not said storage device storing said contents written in said contents write step is attached to said producing apparatus side attaching/detaching portion of said print label producing apparatus; and a contents acquisition step for acquiring at least part of contents stored in the storage device when it is determined that said storage device is attached to said producing apparatus side attaching/detaching portion in said third determination step, wherein at least one of a first selection process and a second selection process is performed, the first selection process selecting contents corresponding to said selection material information acquired from said storage device among said plurality of kinds of contents stored in the memory of said contents supply apparatus in said contents write step, the second selection processing selecting contents corresponding to said selection material information among said plurality of kinds of contents stored in said storage device in said contents acquisition step.

2. A contents processing method comprising:

a first producing apparatus side determination step for determining whether or not a nonvolatile storage device is attached to a producing apparatus side attaching/detaching portion provided in a first print label producing apparatus configured to produce a print label by forming a print on a print-receiving medium;

a first selection information write step for writing unique first selection material information to select said contents suitable for the first print label producing apparatus to said storage device in an attached state when it is determined that said storage device is attached to said producing apparatus side attaching/detaching portion of said first print label producing apparatus in said first producing apparatus side determination step, a second producing apparatus side determination step for determining whether or not the storage device is attached to a producing apparatus side attaching/detaching portion provided in a second print label producing apparatus configured to produce a print label by forming a print on a print-receiving medium after said storage device to which said first selection material information is written in said first selection information write step is detached from said producing apparatus side attaching/detaching portion of said first print label producing apparatus;

a second selection information write step for writing unique second selection material information to select said contents suitable for the second print label producing apparatus to said storage device in an attached state when it is determined that said storage device is attached to said producing apparatus side attaching/detaching portion of said second print label producing apparatus in said second producing apparatus side determination step;

a selection information update step for changing at least part of contents of said first selection material information into third selection material information by said first print label producing apparatus after said storage device to which said first selection material information is written in said first selection information write step is detached from said producing apparatus side attaching/detaching portion of said first print label producing apparatus;

a supply apparatus side determination step for determining whether or not said storage device storing said first and said second selection material information written in said first and said second selection information write step is attached to a supply apparatus side attaching/detaching portion provided in a contents supply apparatus;

a contents write step for selecting contents corresponding to said first and said second selection material information acquired from said storage device among a plurality of kinds of contents different from one another stored in a memory of said contents supply apparatus and for writing the selected contents to said storage device in a state of being attached to said supply apparatus side attaching/detaching portion when it is determined that said storage device is attached to said supply apparatus side attaching/detaching portion in said supply apparatus side determination step;

a third producing apparatus side determination step for determining whether or not said storage device storing said contents written in said contents write step is attached to said producing apparatus side attaching/detaching portion of said second print label producing apparatus;

a first contents acquisition step for acquiring contents corresponding to said second selection material information among contents stored in the storage device when it is determined that said storage device is attached to said producing apparatus side attaching/detaching portion of said second print label producing apparatus in said third producing apparatus side determination step;

a fourth producing apparatus side determination step for determining whether or not said storage device detached from said producing apparatus side attaching/detaching portion of said second print label producing apparatus after acquisition of said contents in said first contents acquisition step is completed is attached to said producing apparatus side attaching/detaching portion of said first print label producing apparatus; and a second contents acquisition step for acquiring contents corresponding to the third selection material information in a case where contents corresponding to said third selection material information is included in contents stored in the storage device in correspondence to said second selection material information when it is determined that said storage device is attached to said producing apparatus side attaching/detaching portion of said first print label producing apparatus in said fourth producing apparatus side determination step determines.

3. A contents processing system comprising:

a print label producing apparatus that has a producing apparatus side attaching/detaching portion and is configured to produce a print label by forming a print on a print-receiving medium; and a contents supply apparatus that has a memory and a supply apparatus side attaching/detaching portion;

said print label apparatus including:

a first determination portion configured to determine whether or not a nonvolatile storage device is attached to said producing apparatus side attaching/detaching portion; and a selection information write portion configured to write unique selection material information to select contents suitable for the print label producing apparatus to said storage device in an attached state when it is determined that said storage device is attached to said producing apparatus side attaching/detaching portion by said first determination portion;

said contents supply apparatus including:

a second determination portion configured to determine whether or not said storage device storing said selection material information written by said selection information write portion of said print label producing apparatus is attached to said supply apparatus side attaching/detaching portion; and a contents write portion configured to write at least part of a plurality of kinds of contents different from one another stored in memory to said storage device in a state of being attached to said supply apparatus side attaching/detaching portion when it is determined that said storage device is attached to said supply apparatus side attaching/detaching portion by said second determination portion;

said print label producing apparatus further including:

a third determination portion configured to determine whether or not said storage device storing said contents written by said contents write portion of contents supply apparatus is attached to said producing apparatus side attaching/detaching portion; and a contents acquisition portion configured to acquire at least part of contents stored in the storage device when it is determined that said storage device is attached to said producing apparatus side attaching/detaching portion by said third determination portion; wherein at least one of a first selection process and a second selection process is performed, the first selection process selecting contents corresponding to said selection material information acquired from said storage device among said plurality of kinds of contents stored in said memory by said contents write portion, the second selection processing selecting contents corresponding to said selection material information among said plurality of kinds of contents stored in said storage device by said contents acquisition portion.

* * * * *